F. N. ROEHRICH.
WIRE NETTING MACHINE.
APPLICATION FILED JULY 9, 1909.
991,542.
Patented May 9, 1911.
22 SHEETS—SHEET 10.
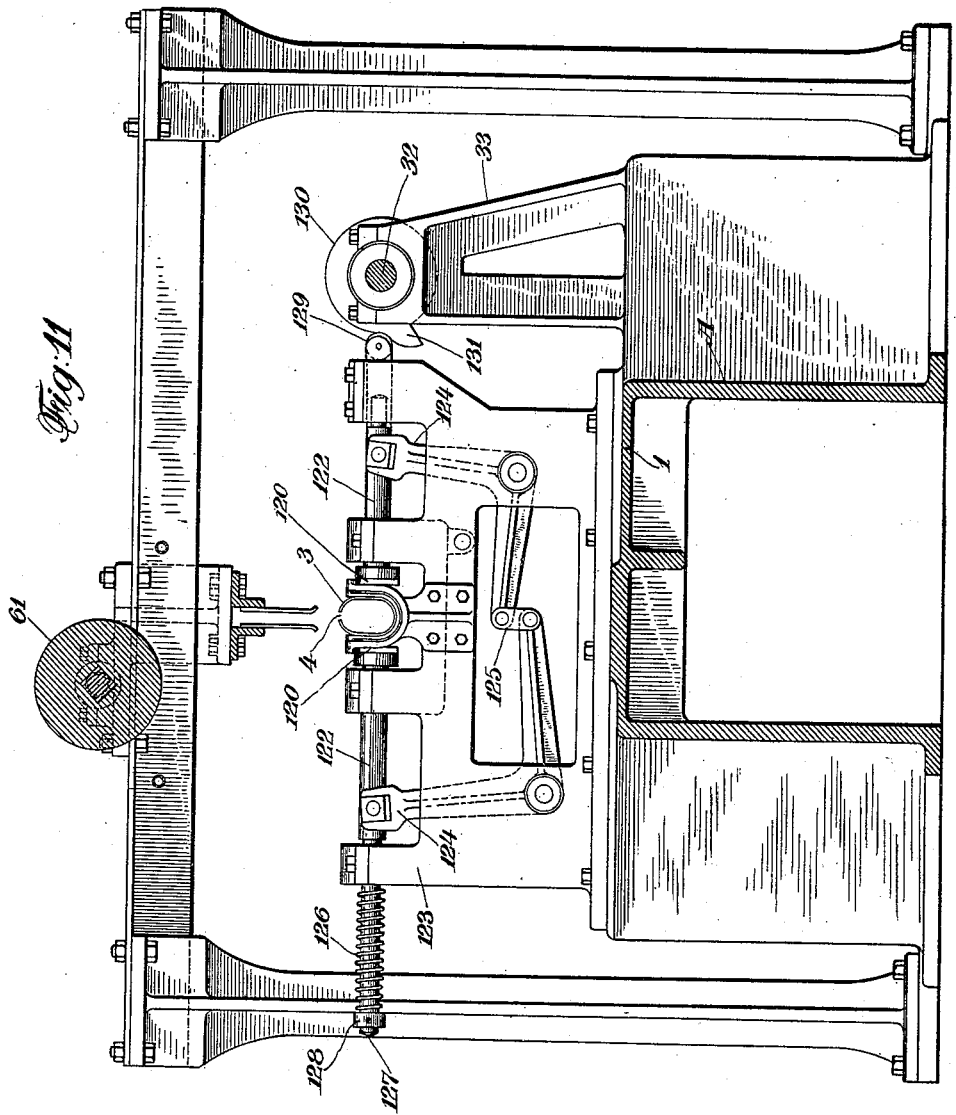
Witnesses:
John E. Prager
Inventor
Frank N. Roehrich
By his Attorney

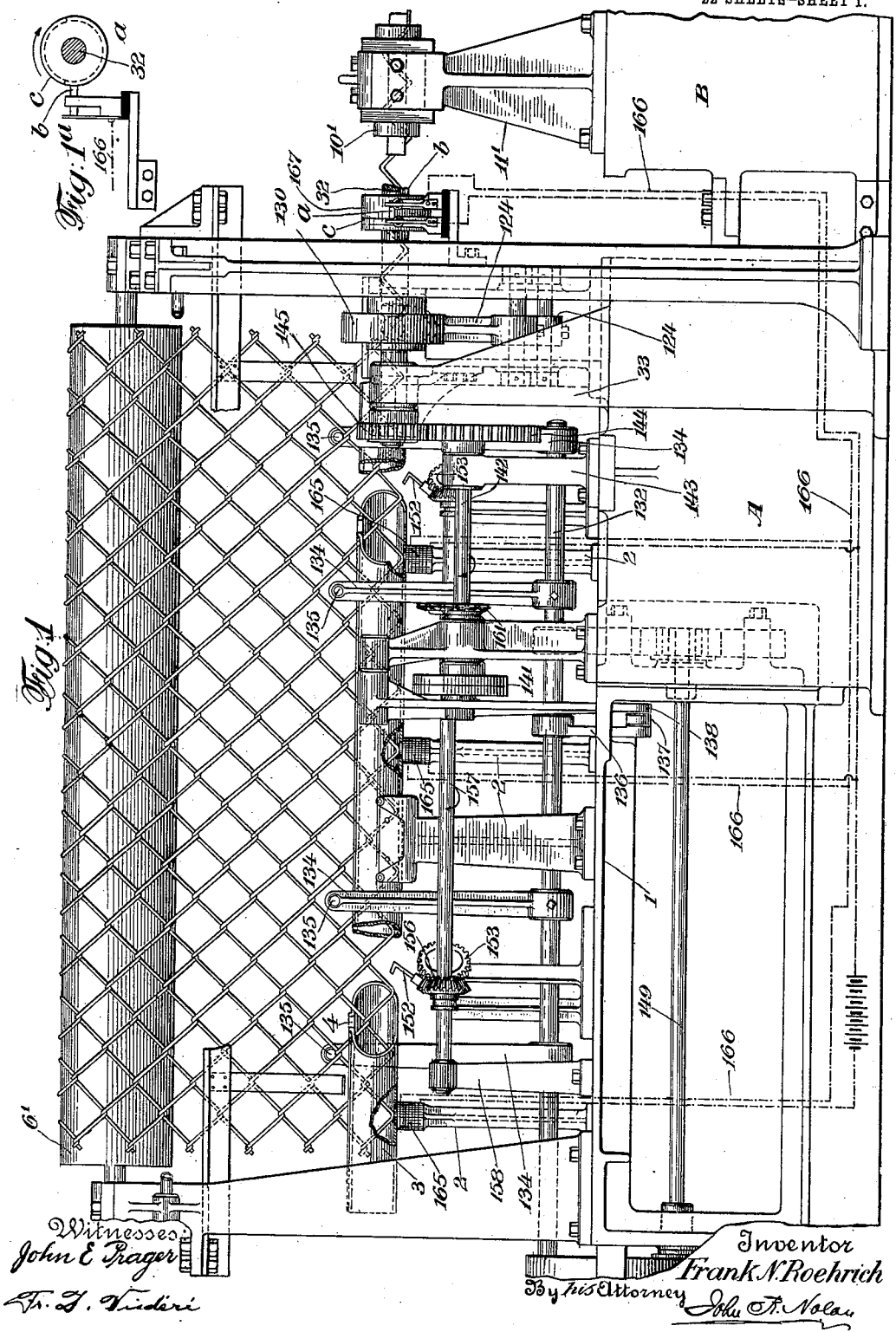

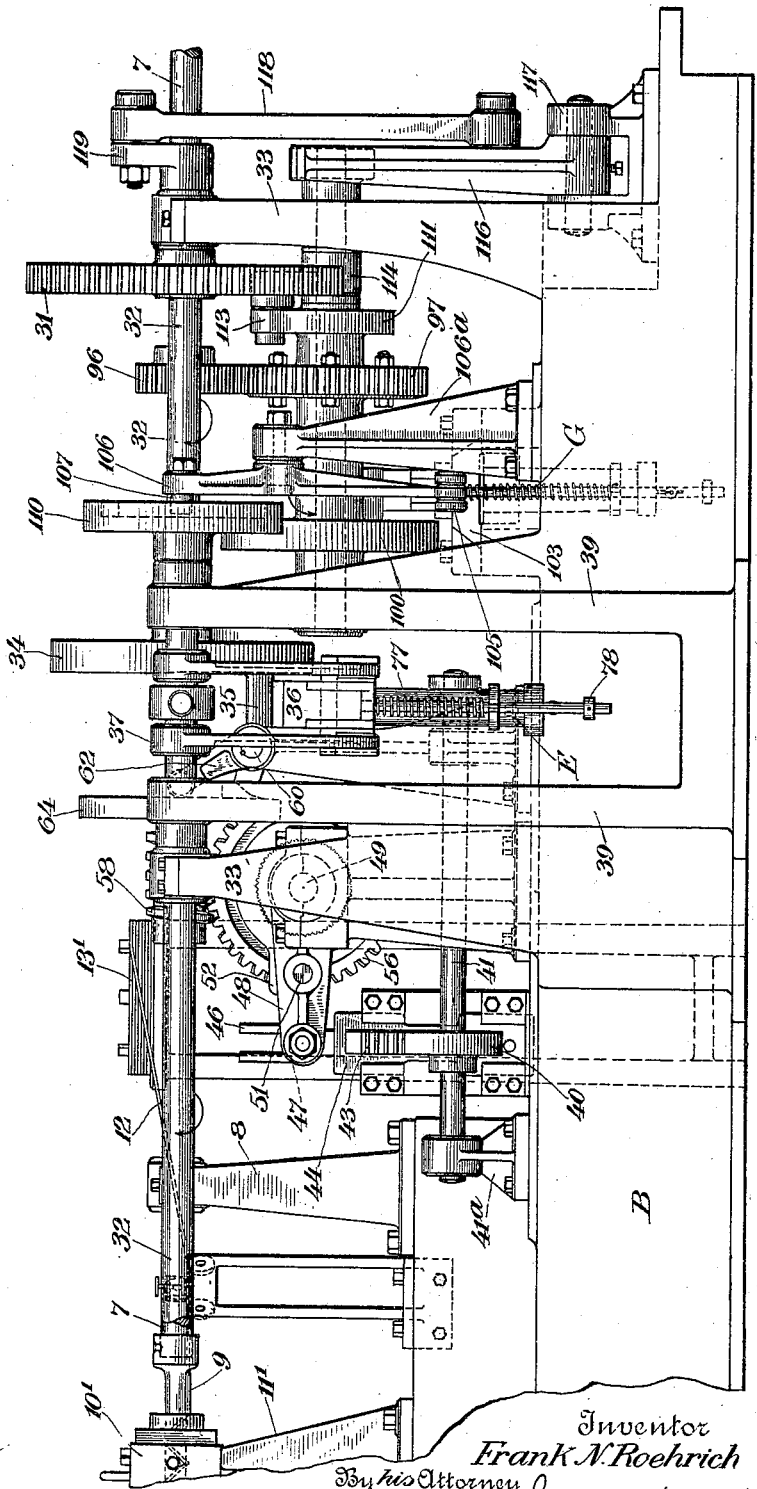

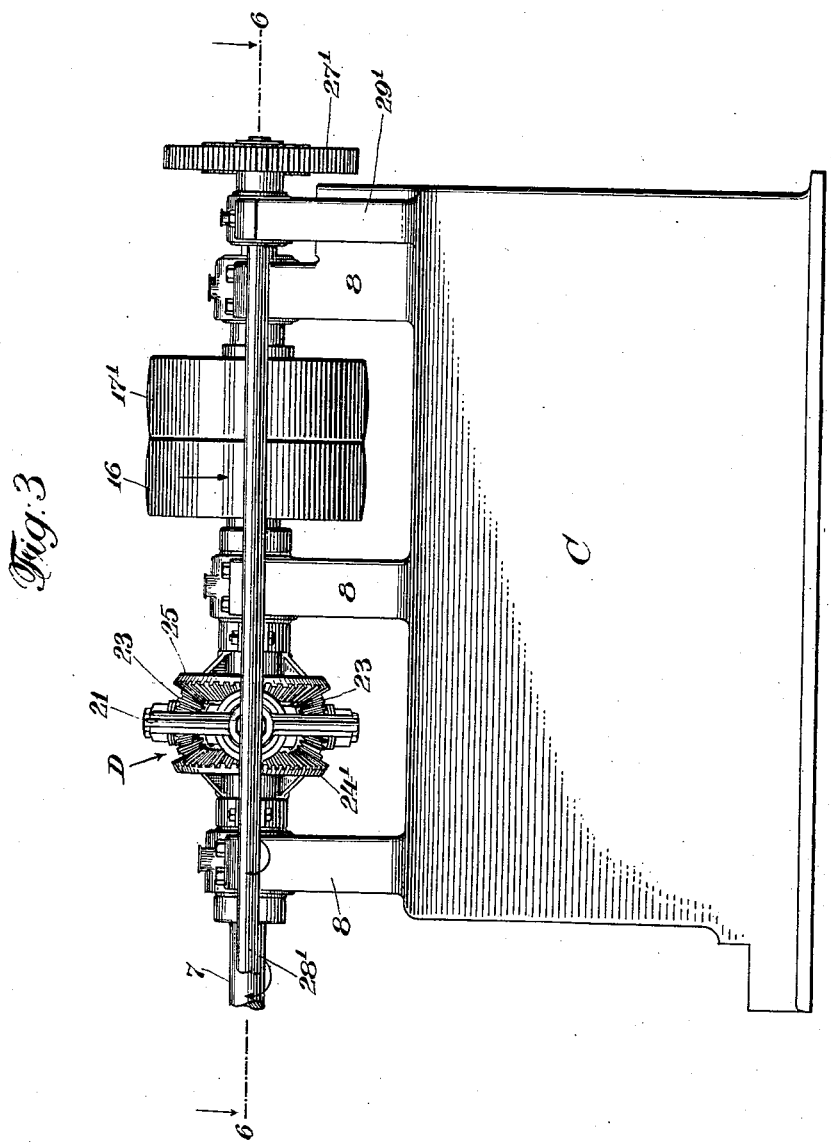

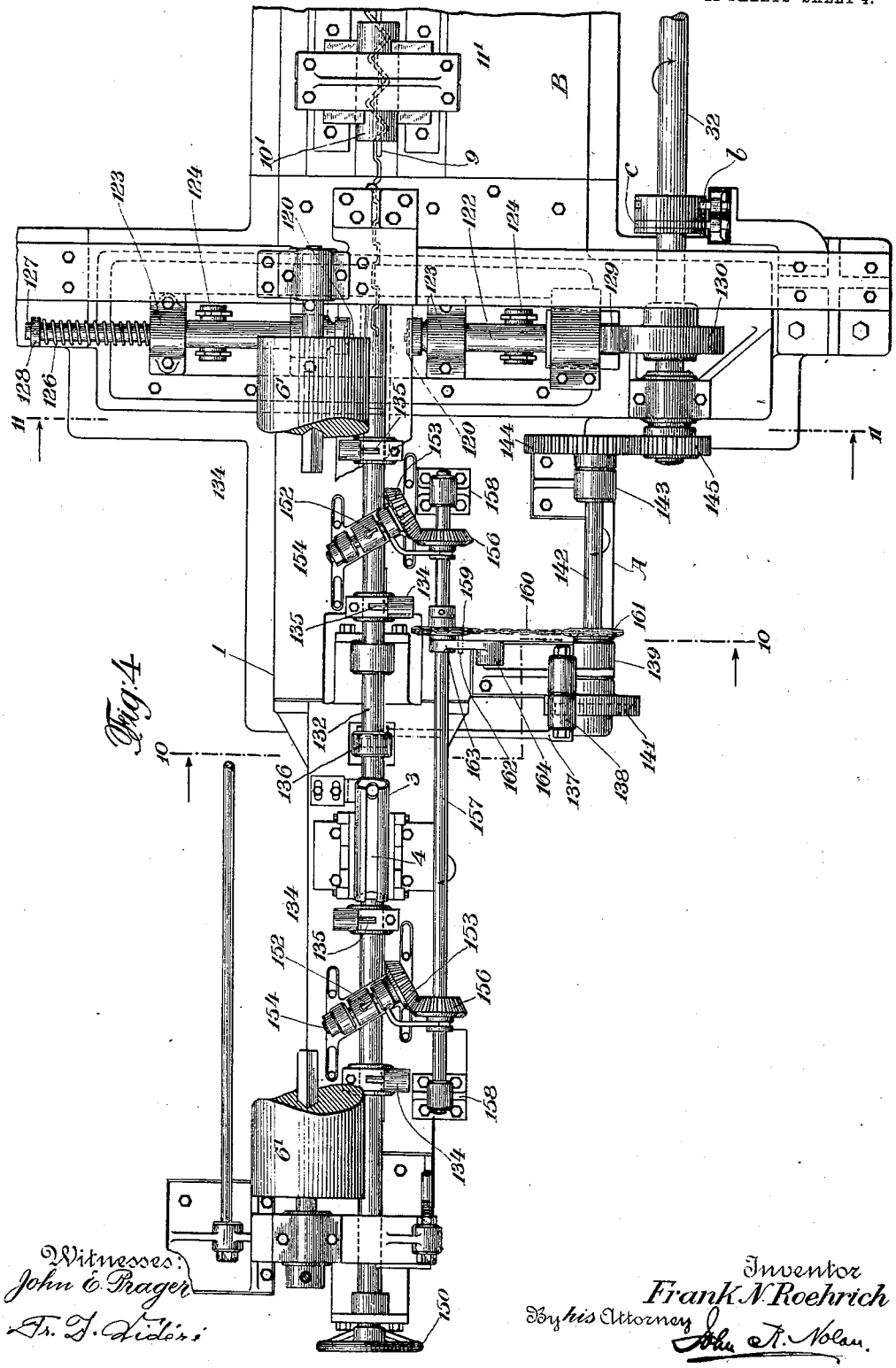

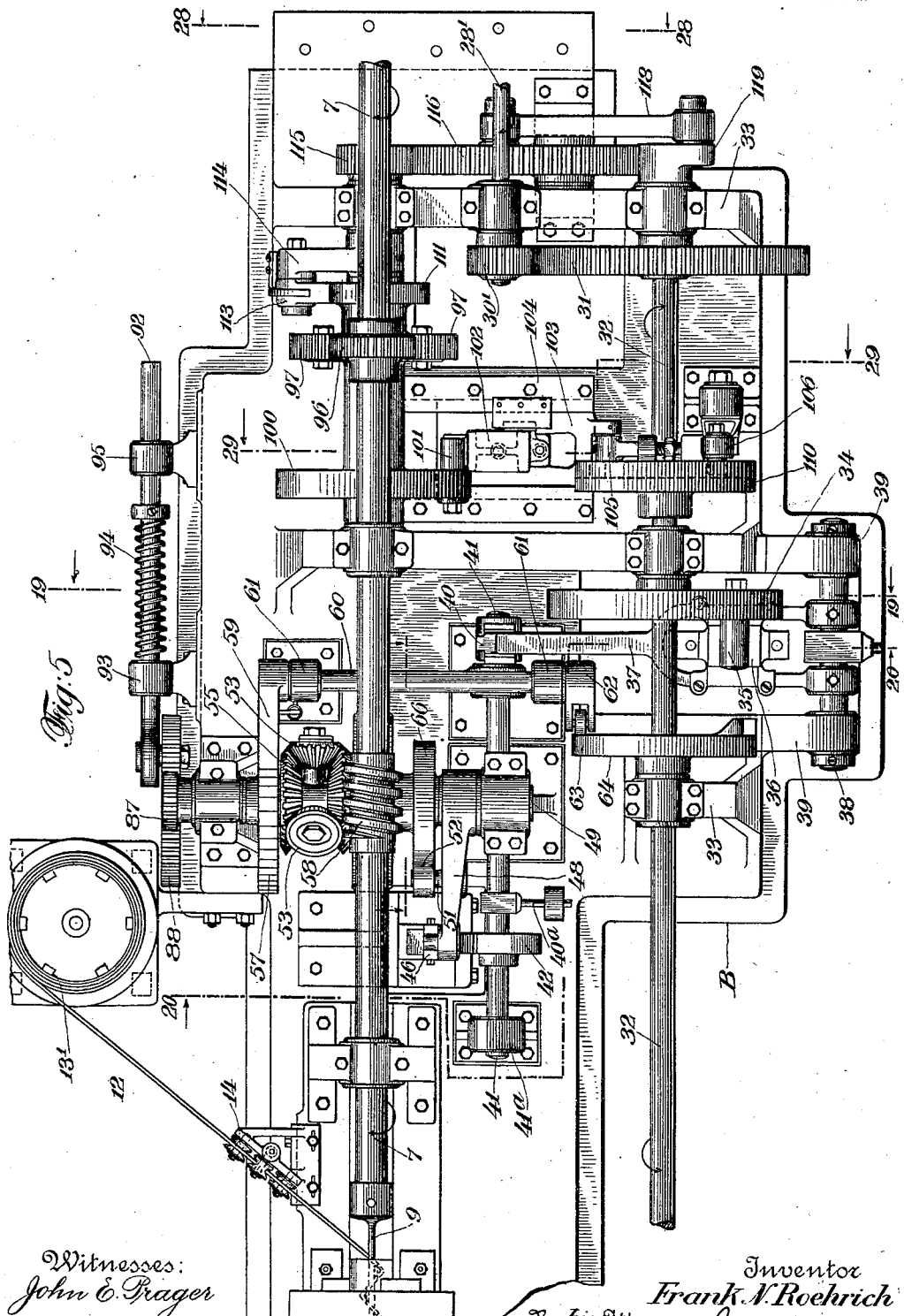

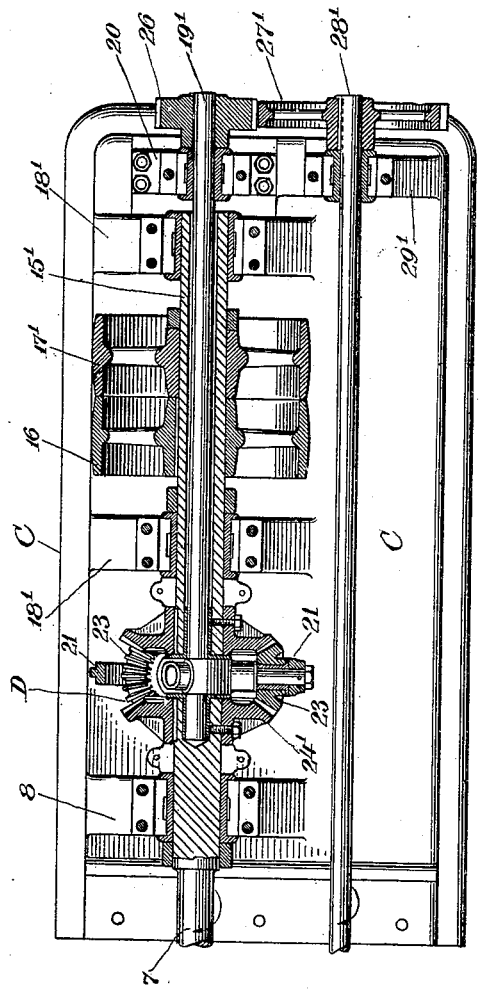

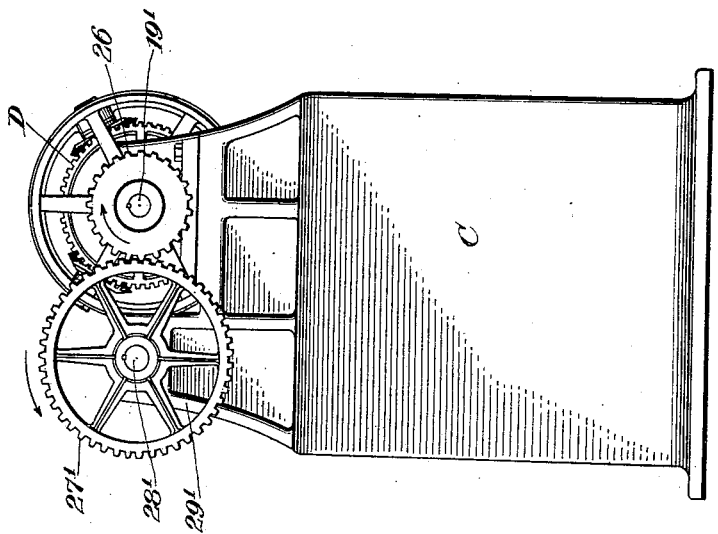
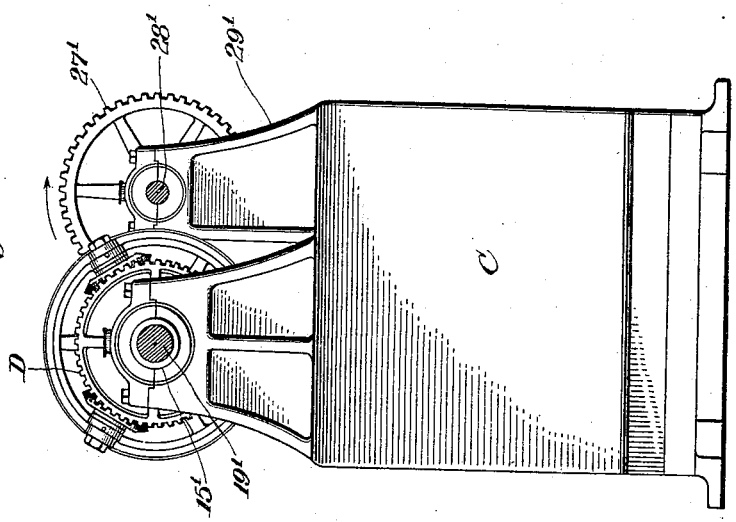

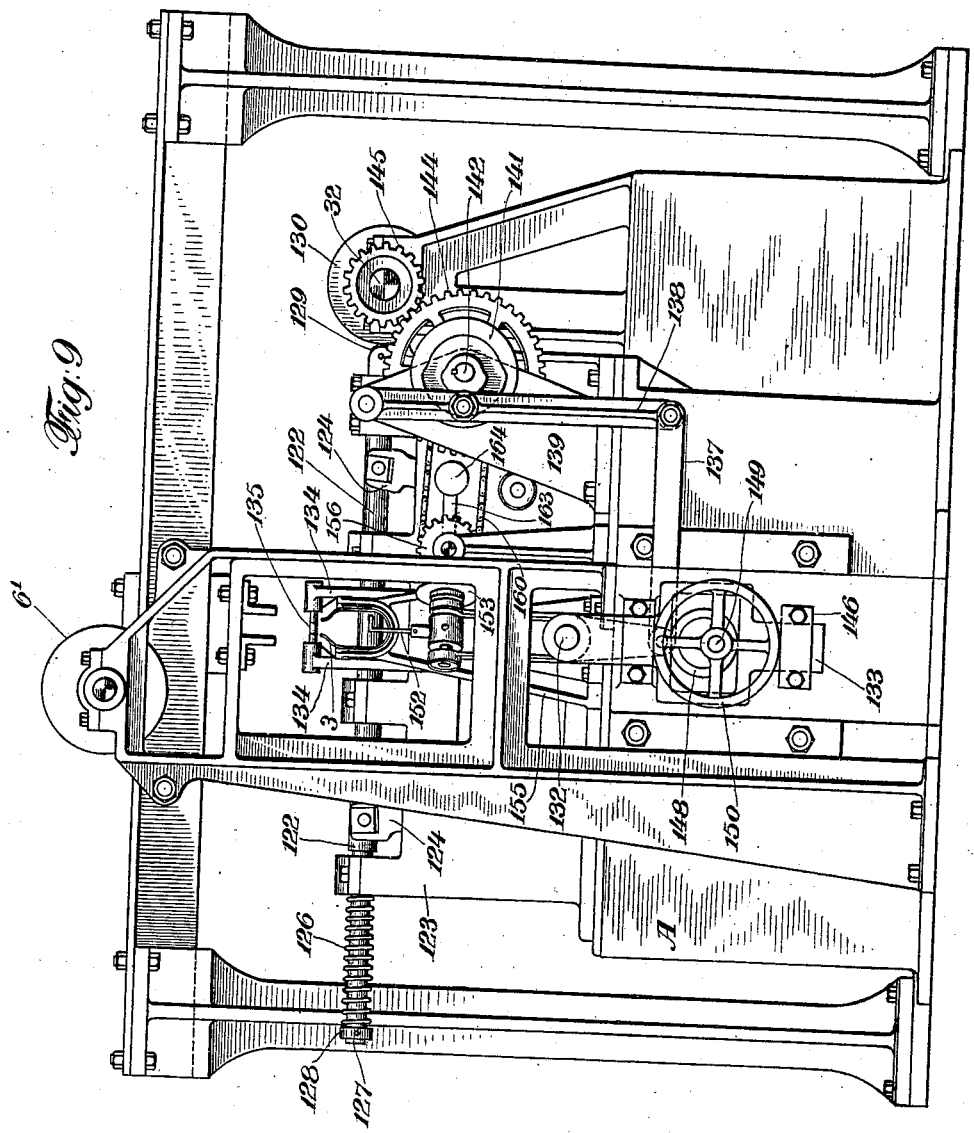

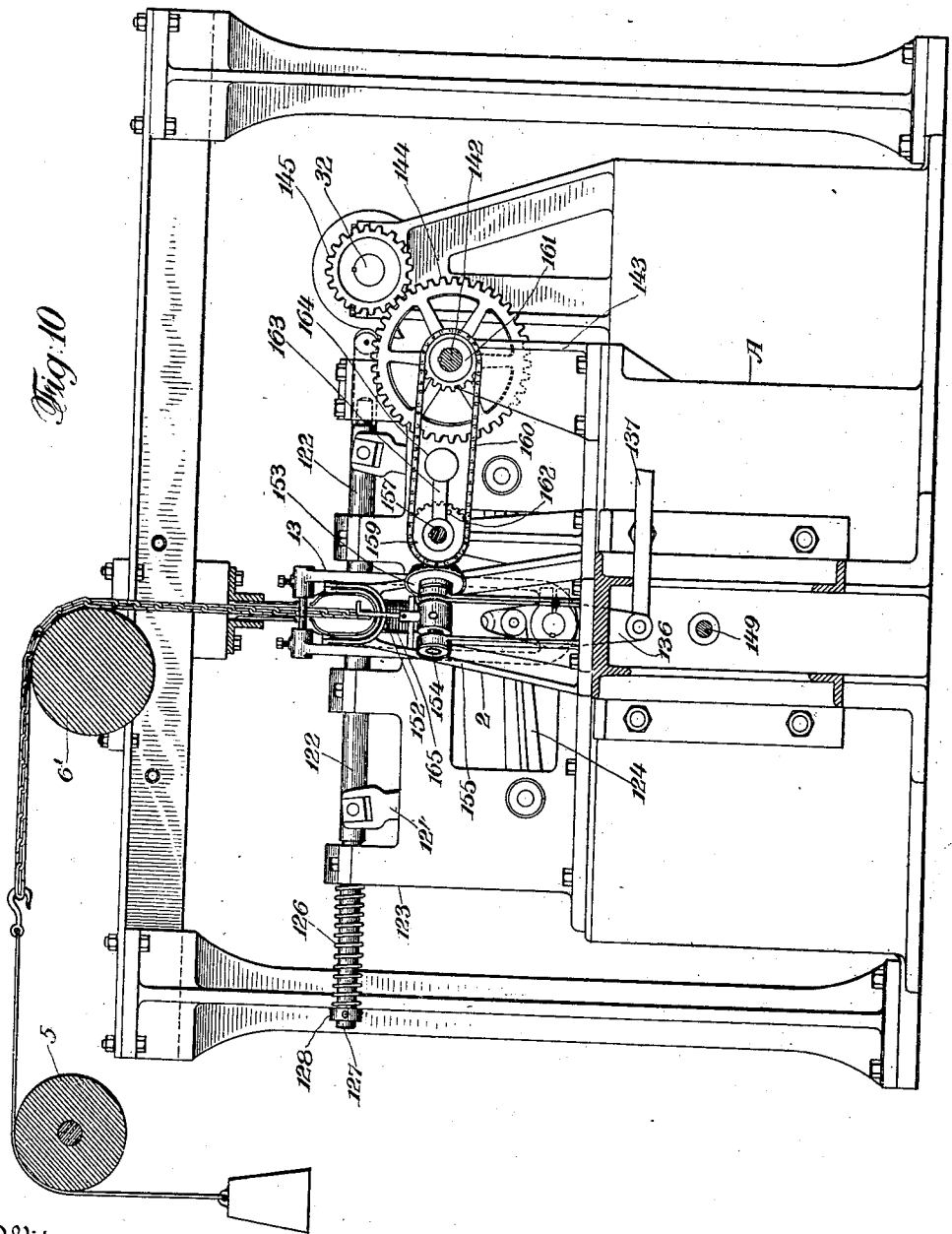

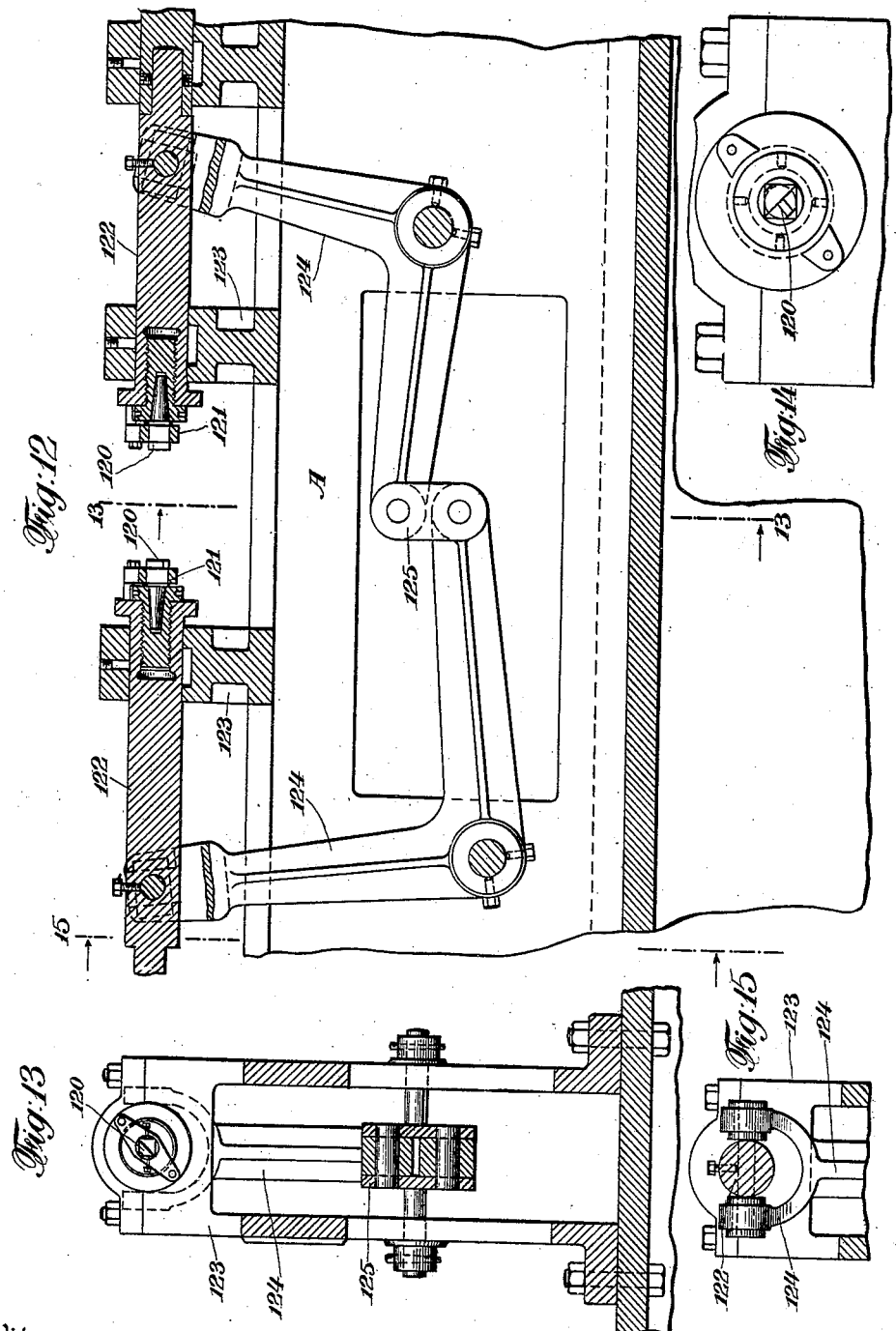

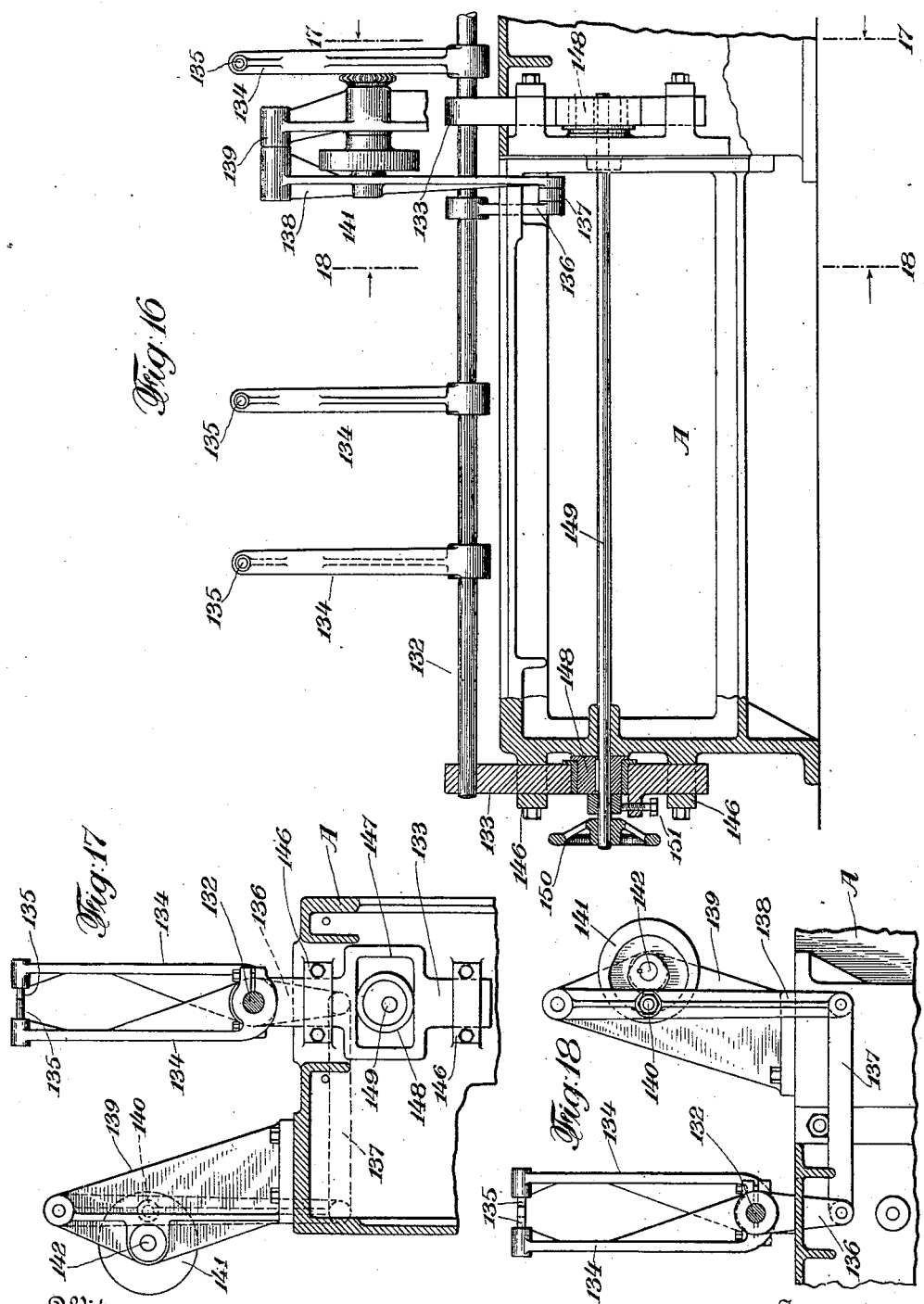

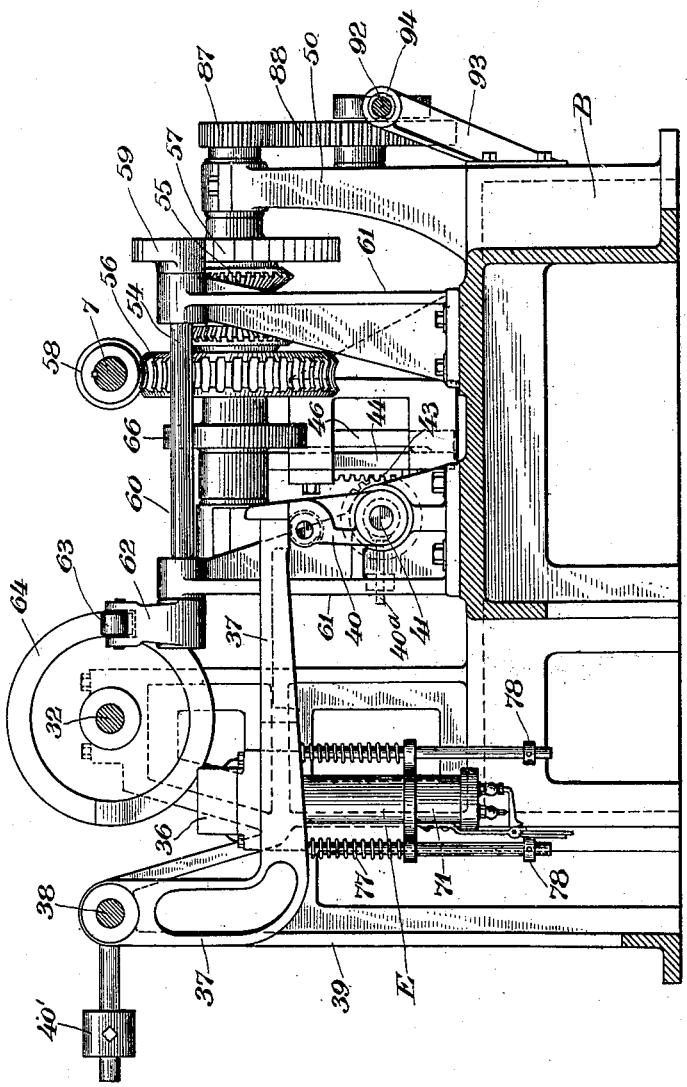

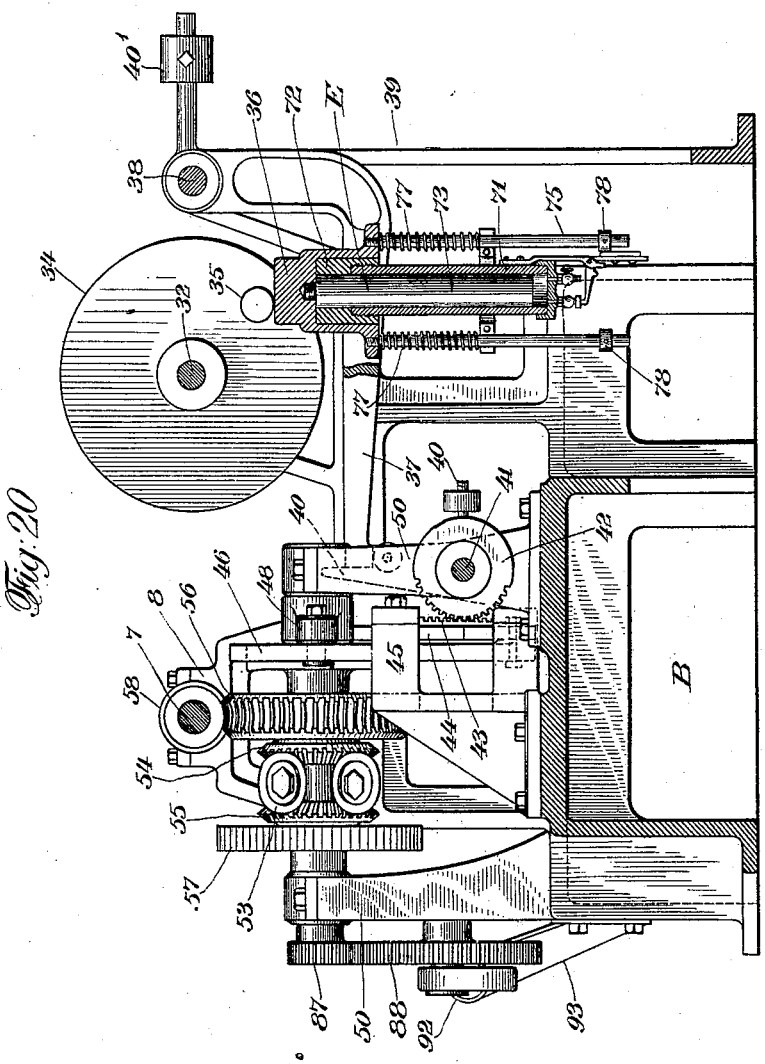

F. N. ROEHRICH.
WIRE NETTING MACHINE.
APPLICATION FILED JULY 9, 1909.
991,542.
Patented May 9, 1911.
22 SHEETS—SHEET 15.
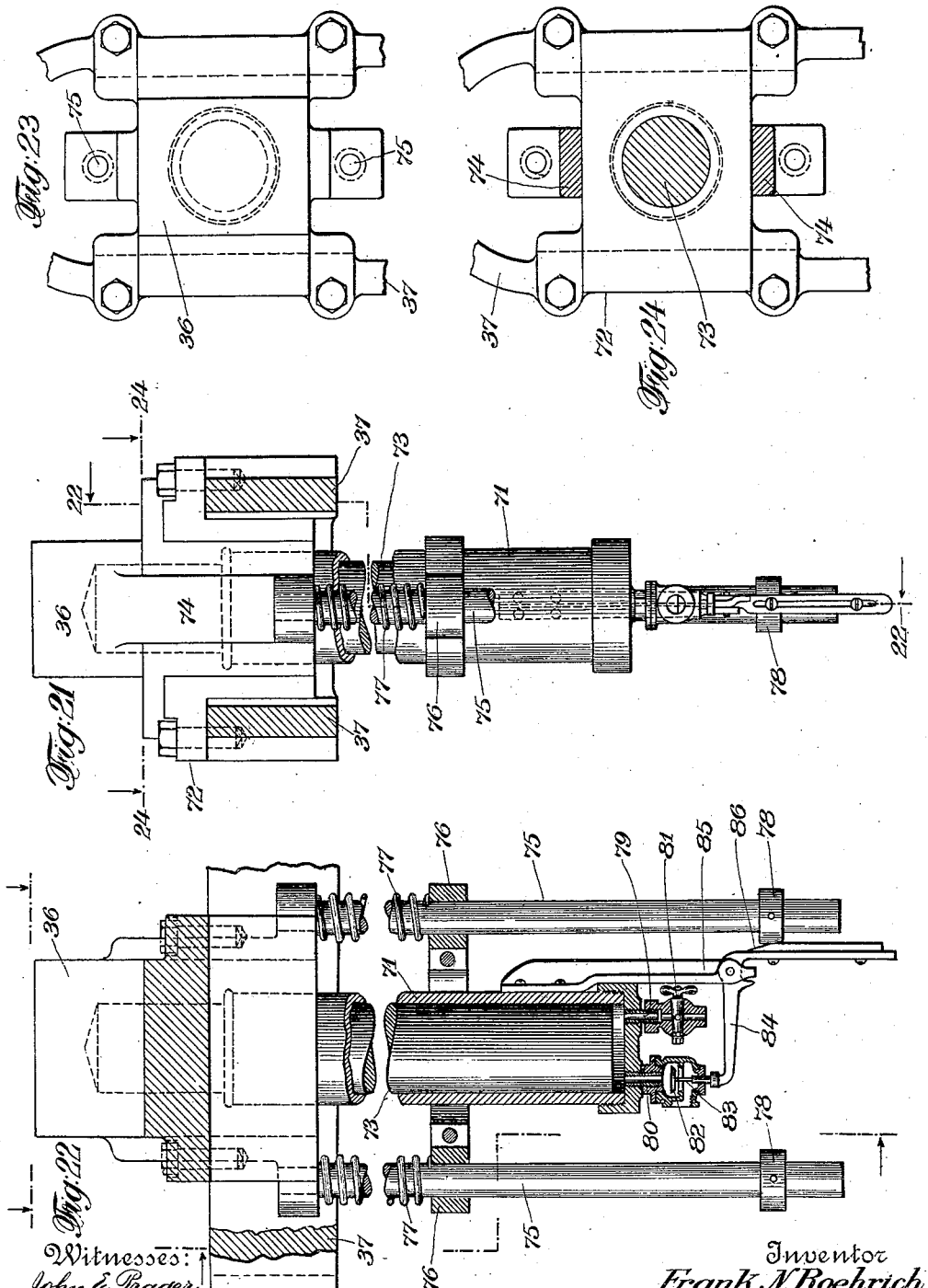
Witnesses:
John E. Prager
Fr. L. ...
Inventor
Frank N. Roehrich
By his Attorney
John R. Nolan
THE NORRIS PETERS CO., WASHINGTON, D. C.

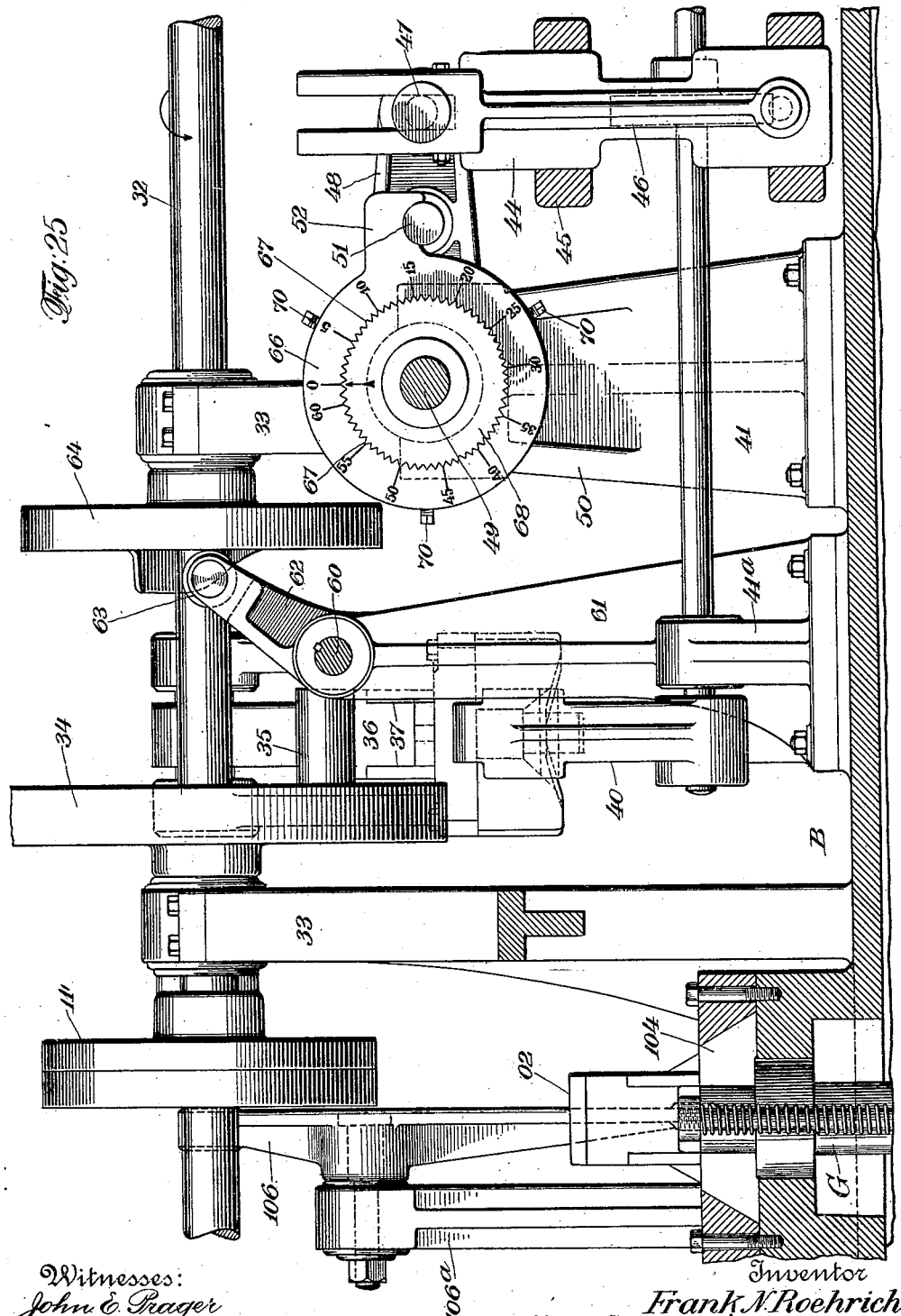

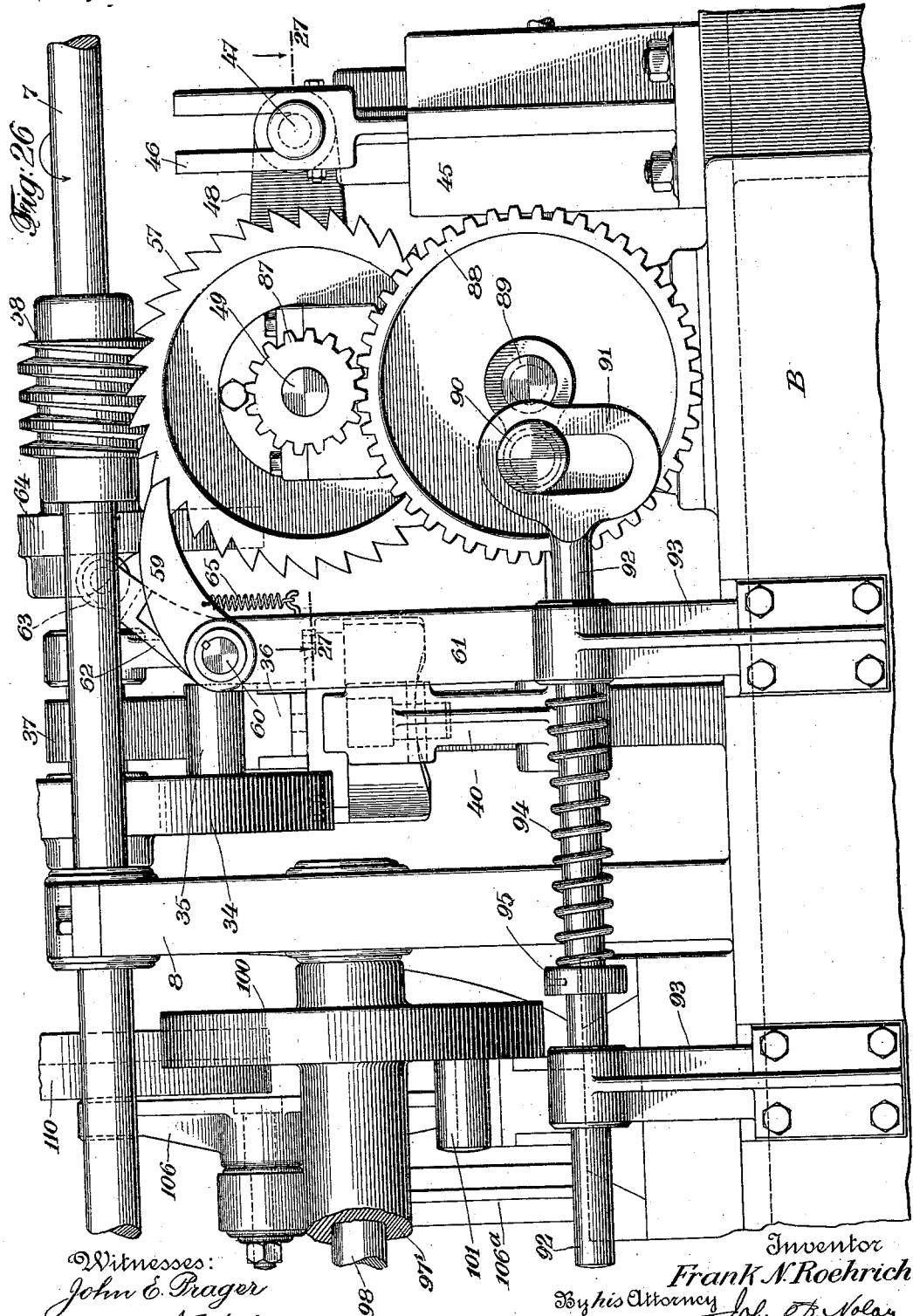

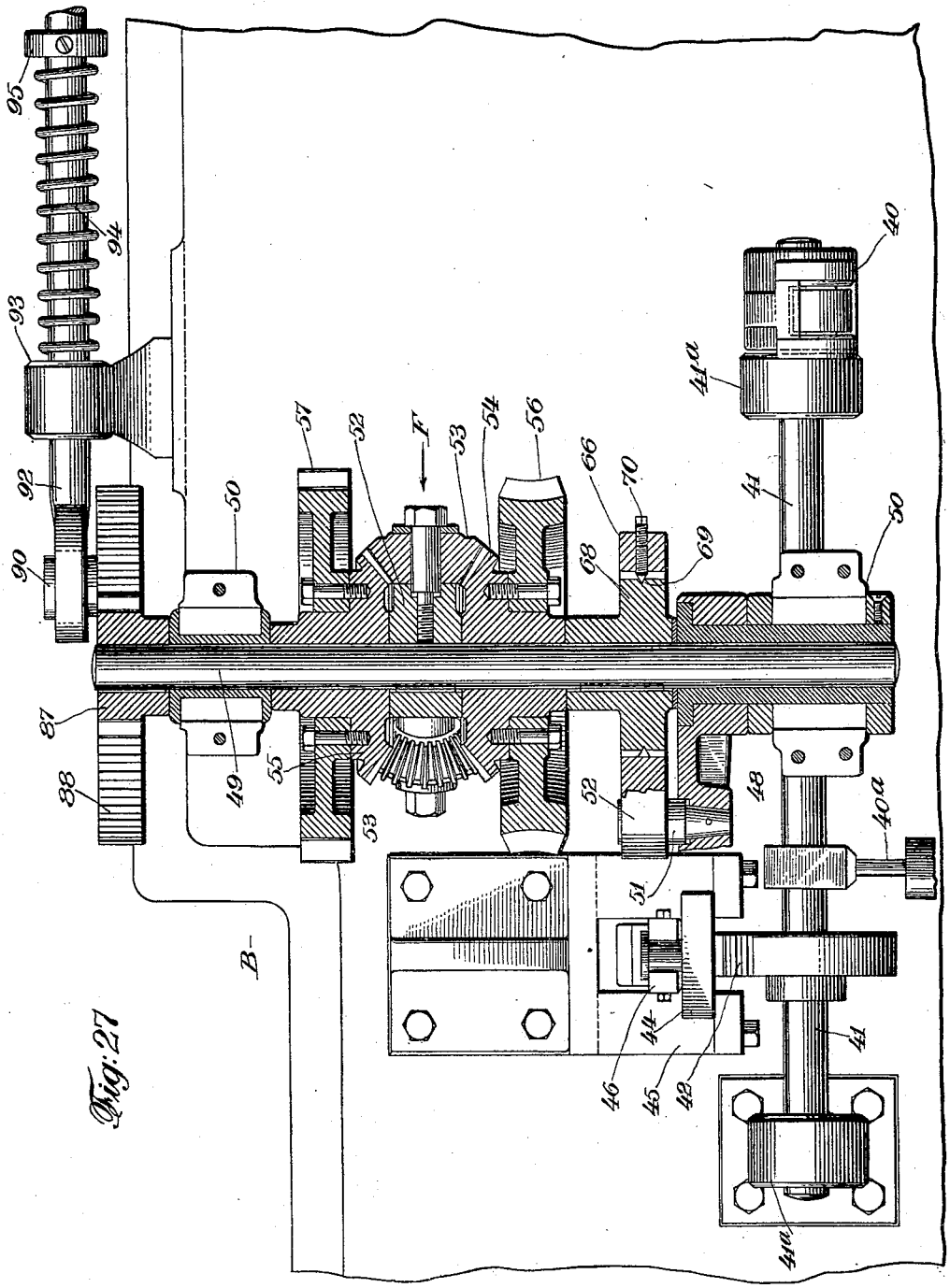

F. N. ROEHRICH.
WIRE NETTING MACHINE.
APPLICATION FILED JULY 9, 1909.
991,542.
Patented May 9, 1911.
22 SHEETS—SHEET 19.
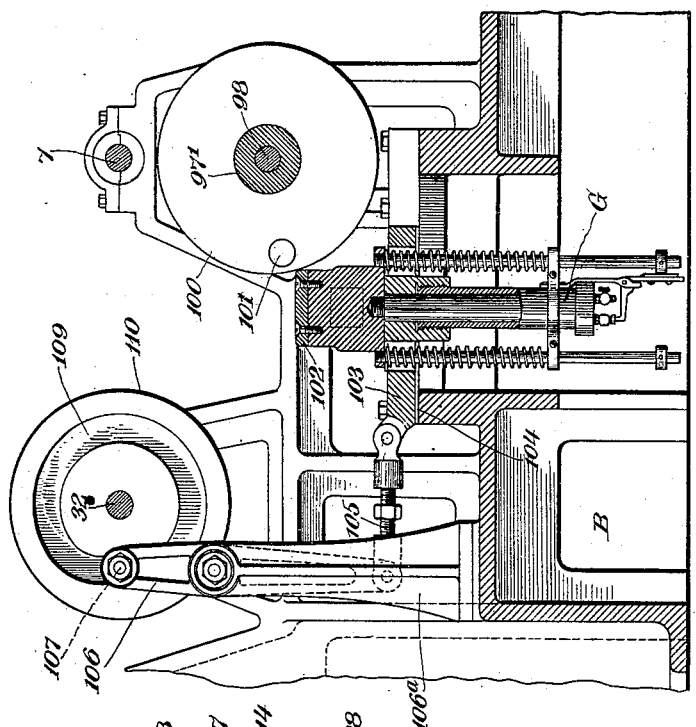
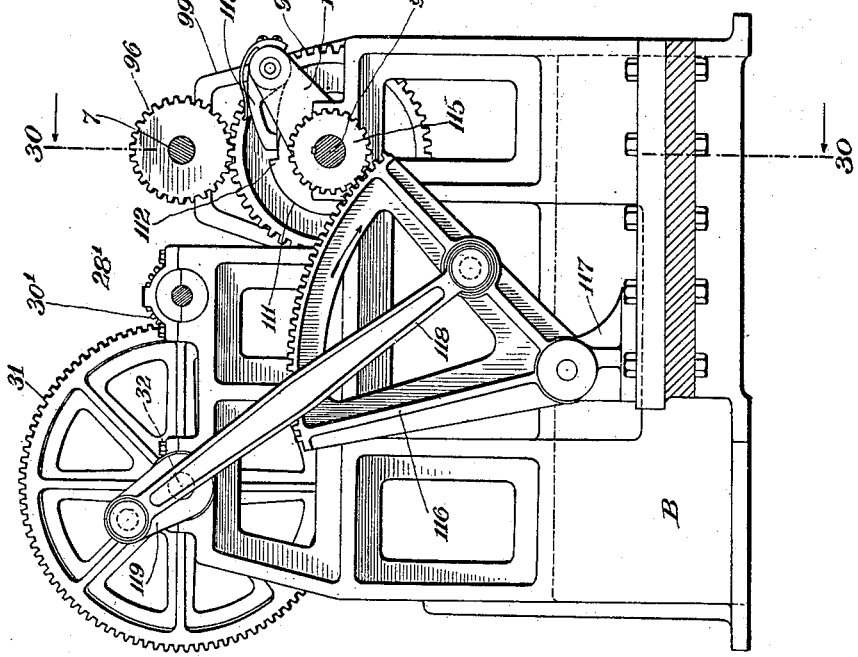
Witnesses:
John E. Prager
Fr. F. Videri
Inventor
Frank N. Roehrich
By his Attorney
John F. Nolan

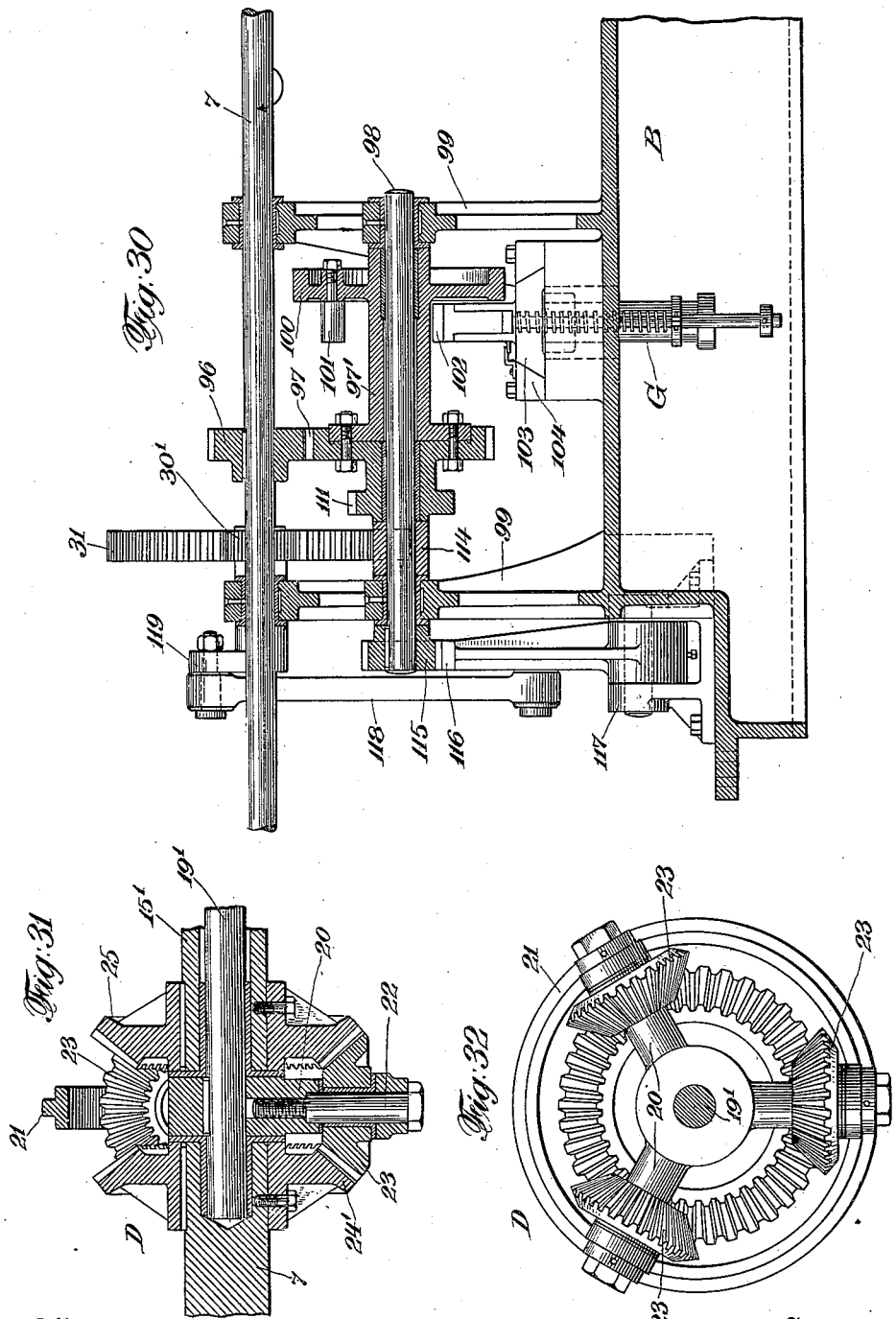

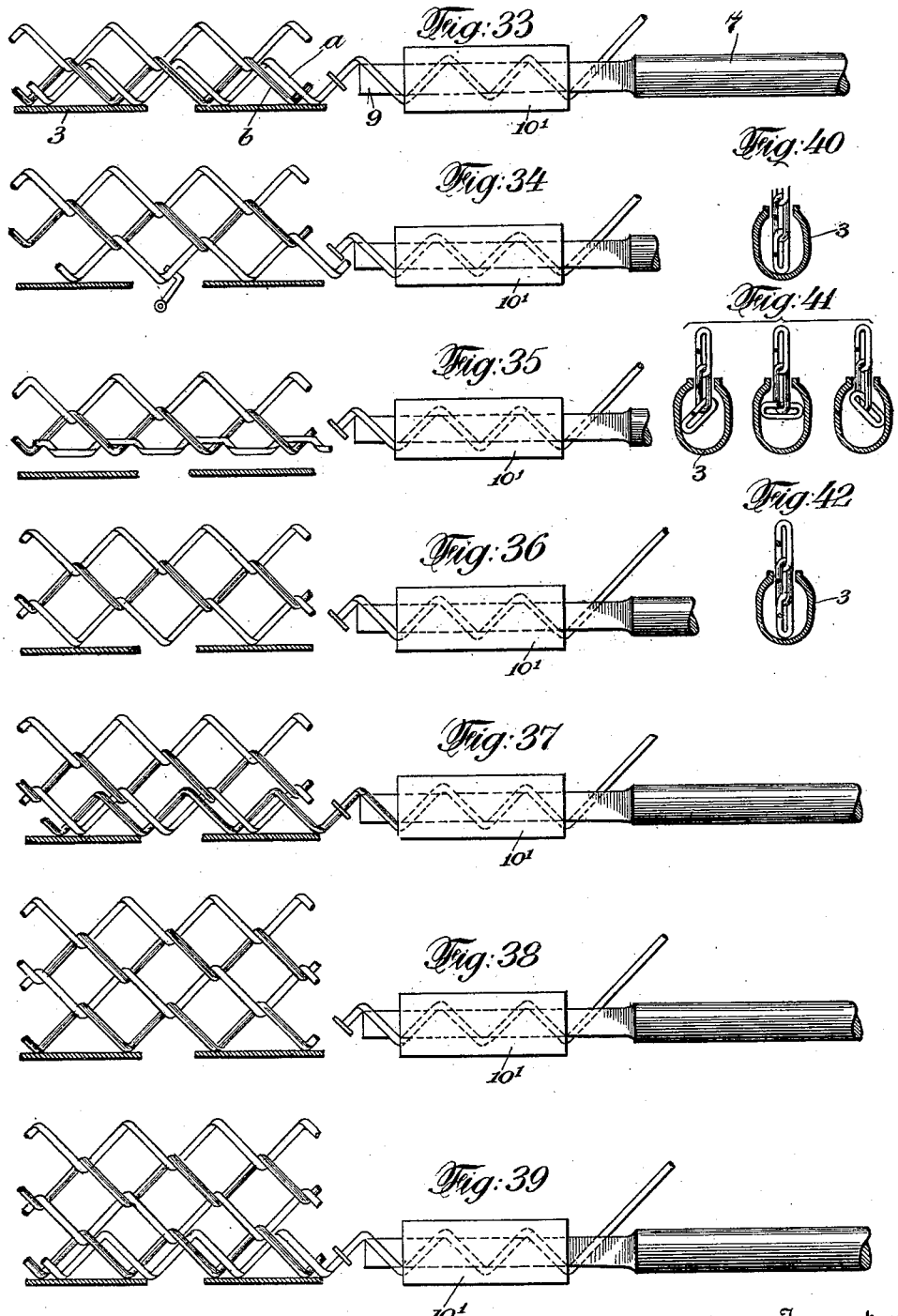

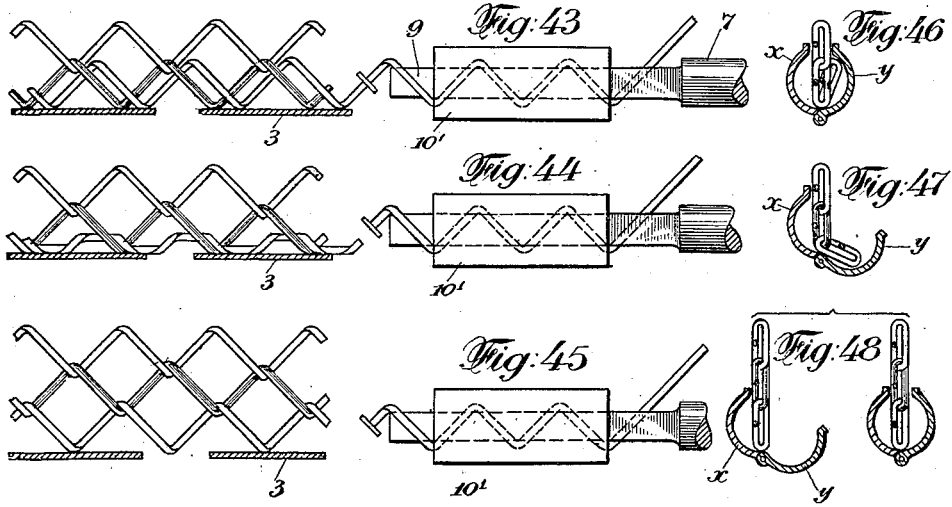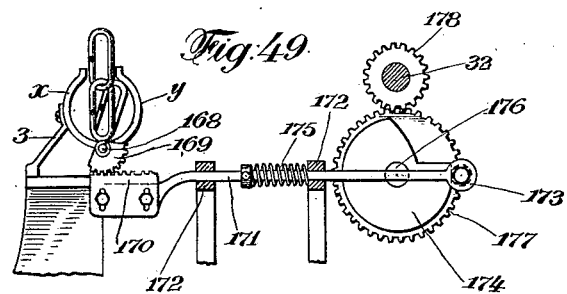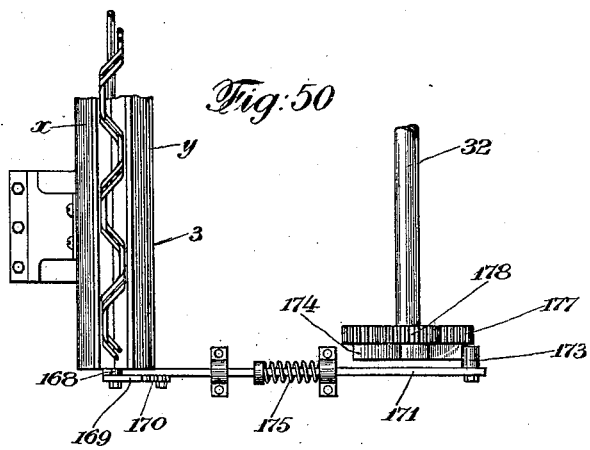

UNITED STATES PATENT OFFICE.

FRANK N. ROEHRICH, OF JERSEY CITY, NEW JERSEY, ASSIGNOR TO HERBERT G. THOMSON, OF NEW YORK, N. Y.

WIRE-NETTING MACHINE.

991,542.  Specification of Letters Patent.  Patented May 9, 1911.

Application filed July 9, 1909. Serial No. 506,829.

*To all whom it may concern:*

Be it known that I, FRANK N. ROEHRICH, a subject of the Emperor of Austria-Hungary, (who has declared his intention to become a citizen of the United States,) and resident of Jersey City, in the county of Hudson and State of New Jersey, have invented certain new and useful Improvements in Wire-Netting Machines, of which the following is a specification.

This invention relates to wire-netting machines, having reference more particularly to that class of machines whereby wire from a suitable source of supply is progressively coiled into zig-zag or helicoidal form, and severed at predetermined intervals; each succeeding length or section of wire during its zig-zag or helicoidal formation and rotative advancement being interlooped with the angular bends or turns of the immediately preceding length or section within the fabric.

The object of my invention is to provide a machine whereby, among other important advantages, the operations of coiling and cutting the wire shall be efficiently performed in proper sequence with a minimum expenditure of power; and whereby the alinement of the succeeding interlooped wires of the concrete fabric shall be properly accomplished without varying the angularity of the cutters with respect to the reversely-inclined end bends of succeeding sections, and without shogging the body of the fabric with relation to the cutters.

My invention, stated in general terms, with the machine considered as an entirety, comprises various novel devices and combinations of mechanism constructed, correlated and adapted to coöperate automatically and efficiently to convert wire into netting or fabric, all of which will be hereinafter fully described, and the novel and characteristic features defined in the appended claims.

In the drawings—Figures 1, 2 and 3, considered together, are a side elevation of a machine embodying my invention in an efficient form; the longitudinal guide within which the wires are consecutively interlooped being partly broken away in Fig. 1, and the fabric being therein shown in course of construction. Fig. 1ᵃ is a detail of a commutator or contact device for periodically making and breaking an electric circuit hereinafter described. Fig. 4 is a plan of the mechanism shown in Fig. 1 the wire fabric being omitted, and the guide and supporting roller being partly broken away for clearness. Fig. 5 is a plan of the mechanism shown in Fig. 2. Fig. 6 is a horizontal section, as on the line 6—6 of Fig. 3. Fig. 7 is an elevation of the left hand end of the mechanism shown in Fig. 3. Fig. 8 is a similar view of the right hand end of said mechanism. Fig. 9 is an elevation of the left hand end of the mechanism shown in Fig. 1, the fabric being omitted. Fig. 10 is a partial transverse vertical section as on the line 10—10 of Fig. 4, a take-up roller for the fabric being indicated. Fig. 11 is a partial transverse section on a plane adjacent the wire cutting devices. Fig. 12 is a similar section, enlarged, through the cutters and adjuncts. Fig. 13 is a vertical section, as on the line 13—13 of Fig. 12. Fig. 14 is an end elevation of one of the cutters, enlarged, and its adjacent parts. Fig. 15 is a sectional detail, through one of the cutter bars, showing the lever connection therefor, as on the line 15 of Fig. 12. Fig. 16 is a sectional detail, in partial elevation, of the oscillating stop-bearing arms for determining the intermittent movement vertically of the fabric, showing the actuating and adjusting devices therefor. Figs. 17 and 18 are transverse vertical sections, as on the lines 17—17 and 18—18, respectively, of Fig. 16. Fig. 19 is a transverse vertical section of the machine on a plane adjacent the trip devices for controlling the stop devices for the cutter shaft, as on the line 19—19 of Fig. 5. Fig. 20 is a similar section, as on the line 20—20 of Fig. 5. Fig. 21 is an enlarged detail, in elevation, of the dash-pot with its plunger abutment, showing the supporting lever therefor, in cross section. Fig. 22 is a vertical section, as on the line 22—22 of Fig. 21. Fig. 23 is a plan of Fig. 22. Fig. 24 is a transverse section, as on the line 24—24 of Fig. 21. Fig. 25 is a longitudinal vertical section on a plane through a transverse shaft which carries an adjustable tappet arm for actuating the trip devices for the cutter shaft; said arm and its associated parts, together with a portion of the cutter shaft and adjuncts, being shown in elevation. Fig. 26 is a partial side elevation of the machine in the vicinity of the transverse shaft, showing among other things the spring and gear devices for turning the shaft and the tappet arm to a normal position of the locking of the cutter shaft. Fig. 27 is a transverse horizontal section through the gearing and tappet devices on the transverse shaft, adjacent parts being shown in plan, as on the line 27—27 of Fig. 26. Fig. 28 is a transverse vertical section, as on the line 28—28 of Fig. 5, showing, in side elevation, mechanism for imparting a supplemental movement to the ceiling spindle. Fig. 29 is a similar section on a plane through the abutment device for temporarily locking the coiling spindle, showing the mechanism for controlling the position of said device, as on the line 29—29 of Fig. 5. Fig. 30 is a longitudinal vertical section, as on the line 30—30, of Fig. 28. Fig. 31 is a sectional detail of the differential gear through which the power is transmitted from the driving shaft to the working spindle and cutter shaft. Fig. 32 is a transverse section of Fig. 31, adjacent the axial member of the differential gear. Figs. 33 to 39 inclusive, are diagrams illustrating succeeding steps in the operation of cutting the sections of coiled wire, and positioning them with respect to the fabric. Fig. 40 is a cross section of the guide tube within which the consecutive interloopment of the wires is effected, showing the position of the wire sections therein during the step illustrated in Fig. 34. Fig. 41 represents three similar sections of the guide tube, showing the varying positions of the lowermost wire in the performance of the step illustrated in Fig. 40. Fig. 42 is a similar section of the guide tube, showing the position of the wire sections therein in the performance of the step illustrated in Fig. 36. Figs. 43 to 45, inclusive, are diagrams illustrating succeeding steps in a modification of the operation indicated in Figs. 33 to 36, inclusive. Fig. 46 is a cross-section of a modified form of guide-tube, showing the position of the wire sections therein in the performance of the step illustrated in Fig. 43. Fig. 47 is a similar section with respect to Fig. 44. Fig. 48 represents two similar sections with respect to Fig. 45. Fig. 49 is an end view of the modified guide-tube, showing the devices for periodically opening and closing the same. Fig. 50 is a partial plan of said guide-tube and its actuating devices.

A, B, C represent three substantial frame structures in which the various parts of the machine are mounted and operated. The structure A includes a bed or table 1 having thereon uprights 2, upon which is supported longitudinally of the machine a guide 3, within which the fabric is progressively constructed by the consecutive interloopment of coiled or helicoidal lengths of wire. This guide is preferably, though not essentially, a tubular member, having in its top a longitudinal slot or opening 4, through which the fabric passes upward on its way to a suitable take-up roller as 5, an interposed supporting beam or roller 6′ for the fabric being conveniently mounted above and parallel with the guide. The guide is in line horizontally with the coiling spindle 7 which is journaled in bearings in standards 8 on the frame structures B and C. That end of the spindle adjacent the guide, is provided with a flat coiling blade 9 which extends into the spirally grooved bore of a head 10′ supported on a standard 11′ on the frame B. The wire 12 is supplied at a proper angle to the coiling blade from a suitably-disposed reel 13′, (Figs. 2 and 5); the blade in its rotation thereupon progressively taking up and "spiralizing" the wire, which, entering the internal groove of the guide head, is advanced rotatively into the tubular guide 3. Between the reel and the blade is an ordinary wire straightening device 14 through which the wire passes on its way to the blade. When the spiralized wire has been advanced the requisite distance determined by the width of the fabric under construction, the feeding operation is suspended, and cutting devices are brought into action to sever the wire at the proper point and at the proper angle, as will be hereinafter particularly described.

The coiling spindle, and also the cutting devices, are actuated and controlled through a system of differential gearing and associated mechanisms which are so constructed and organized that the periodical starting, operating and stopping of the respective mechanisms, are effected positively and precisely, without jar or shock, thereby requiring a minimum of power to actuate the apparatus and yet insuring the timely and efficient operation of its various instrumentalities.

Adjacent the rearward end of the coiling spindle is a hollow driving shaft 15′ upon which are mounted the fast and loose pulleys 16, 17′, respectively. This shaft has its bearings in boxes supported by standards 18′ on the frame structure C. Within the tubular shaft is a central shaft 19′ one end of which is seated within a socket in the opposing end of the working spindle, the other end of the central shaft having its bearing in a standard 20 of the frame C. (See Figs. 3 and 6.)

The axial member 21 of a differential gear D, is affixed to the shaft 19′ in the space between the opposing ends of the spindle and the hollow driving shaft, said member having, as usual in gears of that type, a series of radial arms 20 which in conjunction with an encircling ring 21 afford supports for radial studs 22 upon which are loosely mounted bevel pinions 23 in mesh with oppositely-disposed bevel wheels 24', 25. (See Figs. 3, 6, 31, 32). These wheels are fast on the ends of the spindle 7, and driving shaft 15', respectively. It will thus be readily understood that if the central shaft 19' be locked the motion will be transmitted from the pulley 16 on the driving shaft through the freely rotating pinions 23 to the gear wheels 24' on the coiling spindle, thereby continuously rotating the latter, and that if, on the other hand, the spindle be locked the motion will be transmitted from the wheel 16 through the pinions of the axial member to the central shaft. The latter shaft is appropriately geared with cutting devices, preferably as below described, and hence by locking and unlocking the shaft 19' and spindle 7 at the requisite intervals, the timely operations of the wire coiling and cutting devices are controlled.

On the outer end of the central shaft 19' is a pinion 26 in mesh with a spur wheel 27' on a shaft 28 which is mounted in bearings in standards 29' on the frame structures B, C, respectively. The shaft 28' is parallel to the shaft 19' and is provided with a pinion 30' in mesh with a spur wheel on another parallel shaft 32, which has its bearings in standards 33 on the frame structures A and B, respectively. The shaft 32 may be conveniently termed herein the cutter shaft, as thereby the cutting devices are operated. This cutter shaft is geared down as above described in order that it shall run at a slow speed compared with the coiling spindle, the ratio in the present case being, for example, as twenty to one. (See Figs. 2 and 5).

As herein illustrated, the cutter shaft is designed to make one rotation at the end of the series of rotations of the coiling spindle necessary to coil each length of wire and feed it into the fabric. The locking of the cutter shaft through its gearing with the shaft 19' locks the latter, and hence the power is applied through the differential gearing D to the twisting spindle.

The preferred mechanism for locking the cutter shaft is as follows: Fast on the cutter shaft is a disk 34 having on one side thereof, near its periphery, a stud 35 into and from the path of which is movable at predetermined intervals, an abutment 36. When the abutment is in the path of the stud 35, the latter contacts with the abutment and thereby temporarily locks the cutter shaft 32 and permits the operation of the coiling spindle. The abutment, in the present instance, is constituted by the plunger head of an ordinary pneumatic dash pot E, which is carried by the bifurcated end of a lever 37 which is fulcrumed on a rock shaft 38 having its bearings in standards 39 of the frame structure B. The lever is provided with a counter weight 40' by means of which the former with its dash pot is normally held in the path of the stud 35. It is temporarily locked in this position by means of a shouldered trip arm 40 which is periodically moved into and from the path of the lever. This trip arm is fast on a rock shaft 41 having its bearings in brackets 41ª on the frame B, which shaft is provided with a weighted arm 40ª whereby the shaft is held normally in a position to maintain the trip arm in the path of the lever. On the shaft 41 is a mutilated or segmental gear 42 which meshes with a vertical rack 43 formed on or affixed to a bar 44 which is slidingly fitted to a guide bracket 45 on the frame B. Pivoted to the end of the slide bar 44 is the lower end of an arm 46, the upper end of which is bifurcated for the reception of a pin or roller 47 on the free end of a horizontal rock-arm 48 which is sleeved on a shaft 49 extending transversely of the machine, which shaft has its bearings in boxes supported by standards 50 on the frame B.

On the body of the rock arm 48 is a lateral pin or roller 51 which extends into the path of a tappet arm 52 mounted on the shaft 49 (preferably adjustably about its axis as hereinafter explained), whereby during the rotation of said shaft the tappet arm abuts against the stud or roller on the rock-arm and depresses the latter. The rock arm correspondingly depresses the arm 46 and, perforce, the rack bar, which, in turn, partially turns the gear 42 and its shaft 41, thereby disengaging the shouldered trip arm 40 from the lever 37 and releasing the abutment from locking engagement with the stud 35 on the disk 34. (See Figs. 2, 5, 19, 20, 25 and 27.)

On the transverse shaft 49 is keyed the axial member 52 of a differential gear F, the bevel pinions 53 of which mesh with two oppositely disposed bevel gear wheels 54, 55, loose on said shaft. To one (54) of these wheels, is affixed a worm wheel 56 and to the other (55) a ratchet wheel 57. The worm wheel is in mesh with a worm 58 on the coiling spindle, whereby during the operation of the latter the worm wheel is slowly rotated. (See Figs. 5, 19, 20, 26 and 27.)

Engaging the teeth of the ratchet wheel is a pawl 59 which is carried by one end of a rock-shaft 60 having its bearings in standards 61 on the frame B. On the opposite end of the rock shaft is an arm 62 carrying a roller 63 which bears against the face of a cam wheel 64 on the cutter shaft 32. A spring 65 secured to the pawl and to one of the standards maintains the pawl and the arm 62 normally in engagement with the ratchet and cam wheels, respectively.

The correlation of the parts, just described is such that during the operation of the coiling spindle the pawl is engaged with the ratchet wheel, thereby locking the latter and its gear wheel 55 against retrograde movement. At the same time, the worm 58 on the spindle is continuously rotating the worm wheel 56 and its gear wheel 54, the latter thus effecting the rotation of the axial member 52 of the differential gear F and perforce the rotation of the transverse shaft 49. As this shaft approaches the end of its rotation the tappet arm 52 thereon impinges against the stud or roller of the rock-arm 48 and effects the release of the cutter shaft, as previously mentioned. At this juncture the forward rotation of the shaft 49 and its appurtenances is interrupted by the stopping of the spindle due to the working load thereon produced by the drag of the wire. The power is thus transmitted to the cutter shaft.

As above indicated, the tappet arm is adjustably mounted on its shaft, the object being to provide for the production of fabrics of different widths, within defined limits, by varying the throw of said arm if desired, and thus changing the period of its engagement with the trip-actuating devices. To this end, as best seen in Figs. 25 and 27, I form the tappet arm on a ring 66 having throughout its inner surface a series of uniformly spaced teeth 67 corresponding with the maximum number of bends or coils to be formed in a section of wire for the fabric; and I key or otherwise affix to the shaft 49 a bushing or collar 68 having throughout its periphery a series of teeth corresponding with and adapted to receive the interdental spaces on the interior of the ring when the latter is applied to the collar. The collar is preferably provided with a medial circumferential groove 69 to receive the points of retaining screws 70 in the ring when the latter is applied to the collar. By this construction it will be seen that by releasing the screws 70, the ring 66 with its integral tappet arm can be readily slipped laterally from the collar, and then moved around its axis and applied to and secured to the collar at any point desired, in order to vary the throw of the tappet arm as predetermined by the width of the fabric. The face of the ring is preferably provided with designations or graduations adjacent the teeth, as indicated in Fig. 25 so as to facilitate the operation of adjusting the tappet arm.

As hereinbefore mentioned, the abutment device carried by the locking lever preferably comprises the plunger head of a pneumatic dash pot. The particular construction of this dash pot device will be seen by reference to Figs. 20 to 24, inclusive.

71 is a vertical cylinder the open upper end of which is screwed into a correspondingly bored supporting block 72 affixed to and within the bifurcated end of the lever; and 73 is a plunger reciprocable within the cylinder and extending through and above the bore of the said block. The upper end of the plunger is provided with the abutment head 36. Formed on or affixed to the head are depending side pieces 74 which slidingly embrace the block so as to be movable vertically by and with the plunger. To these side pieces are affixed the upper ends of rods 75 which are slidingly fitted to perforated guide lugs 76 on the cylinder. Springs 77, encircling the rods, are interposed between the respective lugs and side pieces, so as normally to maintain the head and plunger raised, suitably-disposed collars 78 on the rods serving, in conjunction with the opposing lugs, to limit the upward movement of the head and plunger. The lower end of the cylinder is provided with two ported portions 79, 80, the former of which is provided with a pet valve 81 whereby its port may be opened more or less to permit the escape of the compressed air from the interior of the cylinder, and the other portion having seated therein a puppet valve 82 which, when the plunger is being raised, opens the port to permit the ingress of air to the cylinder. The valve 82 rests on a vertically movable stem 83 in the bottom of the valve casing, and the stem in turn rests upon the horizontal arm of an angle lever 84 which is pivoted to a bar 85 depending from the cylinder. The other or vertical arm of the lever is provided with a cam piece 86 thereon in the path of the collar 78 of one of the guide rods 75, the relation of the parts being such that as the plunger approaches the limit of its downward stroke, the collar, bearing against the cam piece, presses the opposing lever arm laterally and thus raises the other arm and unseats the puppet valve. Thereupon the compressed air below the plunger is permitted freely to escape to insure the complete descent of the plunger, in which case the abutment head rests firmly upon the supporting block on the lever.

When the lever is locked in position as above described, preparatory to the stopping of the cutter shaft, the abutment head is elevated in the path of the stud 35 on the disk 34 by the action of the springs 77. The stud in its rotation impinges against the yielding abutment and depresses it against the force of the springs and the compressed air below the plunger, until the abutment rests upon the supporting block on the lever, whereupon the motion of the stud is arrested as above explained. The springs and compressed air serve effectually to cushion the impact of the opposing parts, and thus to protect the mechanism from the sudden blows and shocks which would result if the abutment were a stationary unyielding body.

On one end of the transverse shaft 49 is a pinion 87 in mesh with a spur wheel 88 on a lower shaft 89. The spur wheel is provided with a wrist pin 90 which enters the vertically slotted portion 91 of a horizontal rod 92 which is slidingly fitted to guide brackets 93 on the frame B. A spring 94 encircling the rod, bears against a collar 95 thereon and one of the brackets in a manner normally to retract the rod, and thus, through the gear wheels 87, 88, maintain the shaft 49 in a position with its tappet arm away from the stud or roller on the rock arm 48, which operates the trip device. (See Figs. 25 and 26.)

During the rotation of the shaft 49 the rod 92 is gradually retracted against the pressure of the spring 94 until the tappet arm has been depressed sufficiently to effect the release of the trip device, as above described; but when during the rotation of the cutter shaft the cam projection of the cam 64 thereon acts against the arm of the rock-shaft 60, such projection presses the arm outward and effects the disengagement of the pawl 59 from the ratchet wheel 57. The differential gear member 55 on the latter is thus free to turn with its shaft, independently of the gear on the worm wheel, and hence the spring 94, being unrestrained, expands, thus retracting the rod 92 and, through the rotation of the intermediate gears, reversely turning the shaft 49 and, perforce, swinging the tappet arm 52 to its normal position away from the rock-arm. Thus the cutter shaft is locked and the parts are in position for a repetition of the operation of the coiling spindle on a succeeding length of wire.

Inasmuch as the spindle is run at a relatively high rate of speed it is desirable to stop its operation slightly before the predetermined length of wire has been fully advanced to the cutting path, and then slowly to turn the spindle for the completion of the feeding operation; thus avoiding the otherwise liability of unduly advancing the wire by momentum. I, therefore, provide auxiliary devices for imparting the final motion to the spindle, which devices in an efficient form thereof, are best seen in Figs. 28, 29 and 30, to which reference will now be had, as follows:

Fast on the spindle is a suitably-disposed pinion 96 is mesh with a spur wheel 97 which is formed on or affixed to a freely rotatable sleeve 97' on a lower parallel shaft 98 which has its bearings in standards 99 on the frame B. Thus the sleeve is rotatable by and with the spindle. Formed on or affixed to the sleeve, to be rotatable therewith, is a disk 100 having on one side thereof, near its periphery, a stud 101 into and from the path of which is movable an abutment 102, which, similarly to the abutment 36, comprises the plunger head of an ordinary dash pot G. As the construction of this dash pot is substantially the same as that previously described, it is needless to repeat the description thereof.

During the normal operation of the spindle the abutment 102 is in retracted position from the path of the stud 101, and hence it does not interfere with the rotation of the spindle, but immediately upon the stopping of the spindle the abutment is moved into the path of the stud. For this purpose the dash pot G is mounted on a horizontal slide 103 which is fitted to a guide 104 in the frame B, and the slide is connected by means of a link 105 with the lower arm of a lever 106 pivoted to a standard 106$^a$ on the frame B, the upper arm of which lever is provided with a lateral stud or roller 107 in engagement with a cam groove 109 in a cam 110 on the cutter shaft. The contour of the cam groove is such that the abutment 102 is moved into the path of the stud 101 at the commencement of the rotation of the cutter shaft 32, and maintained therein until near the end of the rotation, whereupon the abutment is retracted. When the spindle comes to rest at the end of its normal operation, the stud 101 on the disk 100 has passed below the plane of the abutment 102, so as to permit the supplemental turning of the disk and the spindle until the stud contacts with the opposing abutment.

Formed on the hub of the spur wheel 97 is a ratchet wheel 111, having in the present instance one tooth 112 with which is adapted to engage a pawl 113 carried by an arm 114 keyed on the shaft 98. On this shaft is also keyed a pinion 115 with which meshes a toothed sector 116 which is mounted on a stud shaft in a bracket 117 on the frame B. This sector is connected by means of a link 118 with a crank 119 on one end of the cutter shaft 32, whereby during the rotation of the latter the sector is oscillated. In the initial stroke of the sector (in the direction indicated by the arrow in Fig. 28) the engaged pinion and its shaft 98 are rotated, the pawl-bearing arm and its pawl turning with the shaft. The pawl thus engages the ratchet tooth and effects the concurrent rotation of the ratchet wheel and associated gearing, the movement being thereby efficiently transmitted through the sleeved disk to the spindle.

As above indicated, the ratchet wheel is advanced to impart a predetermined number of turns (in the present case two) to the spindle, whereupon the stud 101 of the disk impinges against the opposing abutment 102 and the feeding operation ceases.

It will be understood that, by virtue of the differential gear D, which is included in the driving mechanism, the slow supplemental movement of the spindle is not affected by, nor does it modify, the operation of the central shaft 19' to which the main power is applied; and it will be apparent that the slight movement imparted to the worm wheel 56 by the worm 58 on the spindle, simply occasions a fractional turn of the shaft 49 and the exertion of a little more downward pressure of the tappet arm upon the trip releasing devices.

When the proper length of wire has been coiled and advanced into the fabric, the wire thus introduced is severed in advance of the coiling head by a pair of reciprocating cutters 120 between which the wire is fed. The edges of these cutters are arranged to work in a fixed path and to sever the wire in a plane at right angles to the interposed inclined limb or bend of the wire; and the construction and operation of the parts are such that notwithstanding the reversely extending ends of the succeeding wires, resulting from the interlooping thereof, the end limbs or bends of such wires in the completed fabric are uniformly cut. (See Fig. 1.)

The cutters are affixed to heads 121 which are suitably secured to the inner ends of two oppositely disposed bars 122. These bars are slidingly fitted to guides in standards 123 on the frame A, and are jointed to the upper arms of reversely extending bell-crank levers 124. The lower arms of the levers extend toward and overlap each other and are pivotally connected by means of a link 125, whereby when one of the bars is moved inward or outward the other is correspondingly actuated. The bars are kept normally separated by means of a spring 126, which, encircling an extension 127 of one of the bars, bears against a collar 128 thereon and against the adjacent end of the standard. The outer end of the other bar is provided with a roller 129 which lies in the path of a cam wheel 130 on the end of the cutter shaft 32, whereby at an interval in the rotation of the latter the cam portion 131 thereof impinges against the roller and forces the bar inward, the two cutter bars thus approaching each other and their cutters severing the interposed wire. When the cam portion 131 escapes the end roller of the cutter bar, the two bars resume their normal outer position in readiness for a repetition of the operation upon the next succeeding wire. (See Figs. 4 and 9 to 15 inclusive.)

As the zigzaggy interlooped sections of wire comprising the concrete fabric are of uniform length, it follows that the end portions of the successive sections therein are oppositely inclined, and hence it becomes necessary that the adjacent end portions of the successive wire lengths or sections shall be severed in a manner to present reversely cut extremities when they are in the fabric. I have, therefore, devised a simple and efficient means, embodying novel principles of operation, whereby the successive lengths of wire are severed at a fixed point and angle beyond the fabric, and the sections then shifted relatively to the fabric to advance them properly thereinto, as clearly illustrated in Figs. 33 to 39 inclusive, of the drawings, to which reference will now be had.

As above described, when the proper length of wire has been fed into the guide tube and therein interlooped with the lower row of loops of the fabric, such length is severed from the body of the wire by the cutters. In pursuance of my invention, the wire is thus fed into the tube, engaged with the lower row of loops of the last preceding section of wire, and cut, while such lower row of loops is resting upon or adjacent the bottom of the tube. The end of the wire at the cutting point thus lies rearwardly of the adjacent edge of the fabric, and its angular or inclined portions lie adjacent to and substantially parallel with the correspondingly inclined portions of the wire with which they are engaged, as illustrated in Fig. 33. The fabric is then bodily raised a distance equal to one-half the width of a mesh, in which case the last inserted length of wire, by virtue of the angularity of the opposing parts of the two bottom lengths, is shifted longitudinally, either to the right or to the left, that is, either into the web to alinement with the edge thereof, or slightly outward therefrom and rearward of the plane of the cutters. The wires are thus shifted in alternation throughout the operation of producing the fabric. Each of the alternate wires which are shifted outward as in Fig. 34, is given a partial turn to advance it the prescribed distance into the fabric and insure the alinement of its severed extremity with that of the adjacent wire, as illustrated in Figs. 35 and 36. The length then rests upon the bottom of the tube. The next succeeding length of wire is then fed into the tube and cut off, as illustrated in Fig. 37. The web is then raised as before a distance equal to one-half the distance of the mesh, and by virtue of the relation of its bends or angles to those of the last preceding length, as above indicated, the wire resting upon the tube is shifted inward with its severed end in the same vertical plane as the edge of the web, as illustrated in Fig. 38. Further advancement of this wire is, therefore, not required. The next following wire, however, by reason of the reversed angularity of its bends, as illustrated in Fig. 39, is inserted, cut, and partially turned similarly to the wire described with respect to Figs. 35 and 36. Thus it will be seen that it is only necessary partially to turn the alternate wires to effect their proper disposition and alinement with respect to the others.

As hereinbefore mentioned, the fabric passes to a take-up roller and is maintained under tension thereby. In order that the web shall be intermittently and uniformly raised as the successive wire lengths are introduced thereto, I provide simple and efficient devices which are periodically moved into and from succeeding meshes of the web to afford successively acting stop devices therefor. These devices in a preferable form are best seen in Figs. 1, 4, 9, 10, 16, 17 and 18, to which reference will now be made. Rising from a rock-shaft 132, having its bearing in appropriate brackets 133 in the frame A, is a series of arms 134 which extend above the guide 3. In the present instance there are four arms, two of which are disposed on one side of the tubular guide 3, and two on the other side thereof. They are provided at their upper ends with inwardly projecting pins 135, which are so proportioned and positioned that when the shaft is rocked in one direction, the pins of one pair of arms are entered into the opposing meshes of the web and the pins of the other arms are withdrawn from the adjacent meshes, and conversely. The pins are in the same horizontal plane, but they are so disposed in relation to the meshes that when one pair is in the center of two meshes, the other pair is at the bottom of two meshes, as indicated clearly in Fig. 1. Hence as the two pairs of pins are alternately moved into and from the meshes by the oscilllation of the shaft, said pins alternately serve to permit and determine the upward movement of the fabric a distance equal to one-half the width of a mesh, or the width of a coiled wire section. The shaft is actuated at intervals to insure the requisite intermittent movement of the fabric for the timely insertion and severance of the succeeding wires.

In the present instance the rock shaft is provided with a depending arm 136, which is connected by means of a link 137 with an arm 138 pivoted to a standard 139 on the frame A. The lever is provided with a lateral pin or roller which enters an appropriate cam 141 on a shaft 142. This shaft, which has its bearings in the standard 139, and in a similar standard 143 on the frame, is provided with a spur wheel 144 in mesh with a pinion 145 (Fig. 4) on the cutter shaft, whereby during the rotation of the latter the shaft is actuated; and at the proper intervals, through the agency of the cam 141, the rock shaft and its stop arms are oscillated as and for the purpose mentioned.

In order that the rock shaft can be nicely adjusted vertically to effect the corresponding adjustment of the stop pins with respect to the meshes of the fabric, I provide for the vertical adjustment of the two bearing brackets 133. To this end the brackets are slidingly fitted to guides 146 (Figs. 16 and 17) on the frame A, and each of the brackets is formed with a suitable rectangular opening 147 for the reception of an eccentric 148 on a shaft 149 which is journaled in standards of the frame A. One end of the shaft 149 is provided with a hand wheel 150 whereby it may be conveniently turned, thereby correspondingly turning the eccentrics and effecting the predetermined vertical adjustment of the bearing brackets and the parts carried thereby. The brackets are securely held in adjusted position by means of a set-screw 151 which is fitted to a lug on one of the brackets so as to be movable into and from locking engagement with a boss on the adjacent eccentric. (See Fig. 16.)

A simple and efficient means for partially turning the alternate wire sections comprises tappet fingers 152, in the present instance two, arranged to swing in oblique arcs intersecting the plane of the section near its respective ends, the bottom of the tubular guide having therein suitably located openings for the free upward passage of the fingers. These fingers in the form of embodiment of my invention herein illustrated, (see Figs. 1, 4 and 10) extend upwardly from the hubs of two bevel gear wheels 153, which are mounted on short shafts 154 journaled in standards 155 on the table of the frame A. The shafts 154 are set at a proper angle in order that the fingers during the rotation of the wheels 153, shall swing in a diagonal path to impinge effectively against the opposing wire section and impart a half turn thereto, thereby advancing such wire a distance equal to one-half the width of a mesh. The bevel wheels 153 mesh with similar wheels 156 on a shaft 157 which is journaled in bearings in standards 158 rising from the frame A. This shaft 157 is provided with a loose sprocket wheel 159, which is connected by means of a sprocket chain 160 with a similar wheel 161 fast on the driven shaft 142, above described, whereby the sprocket wheels are concurrently rotated during the operation of the cutter shaft.

On one side of the loose wheel 159 is a laterally projecting stud 162, and on the shaft 157 is affixed, adjacent said wheel, an arm 163 which extends into the path of the stud, the outer end of the arm having a counter weight 164. The correlation of the parts just described is such that the stud on the rotating wheel 159 impinges against the under side of the opposing arm, and carries the latter upward therewith, and consequently partially turns the shaft 157 and swings the tappet fingers diagonally toward the wire section. As the fingers approach the wire the weighted end of the arm passes the center of gravity and, being unsupported, abruptly descends, thereby rapidly moving the shaft 157 and, perforce, causing the fingers sharply to impinge against the opposing wire section and effect its partial rotation for the purpose stated. This operation is repeated for each alternate wire.

In order to obviate any liability of displacement of the lowermost wire section within the guide 3, while a new length or section is being interlooped therewith, I preferably provide a series of electro-magnets 165 (Fig. 1) the poles of which enter apertures in the bottom of the guide, and, when energized, attract and hold securely in place the contiguous portions of the wire section. These magnets, of which in the present instance three are indicated, are supported upon the posts 2 and are included within an electric circuit 166 which at predetermined intervals is completed and broken by an ordinary commutator or rotary contact device 167 (Figs. 1 and 1ª) on the cutter shaft, that is to say, immediately before the advancement of the new wire section to the guide the circuit is completed by the wider portion $a$ of the contact ring electrically connecting the two terminal brushes $b$ of the circuit, such portion being of sufficient extent to connect the two brushes during the period that the new section is being formed, inserted and severed, whereupon and preparatory to the raising of the fabric the circuit is broken by the remaining portion $c$ of the ring which is of sufficient width to contact with only one of the brushes.

The general operation of the apparatus thus described may be summarized as follows:—Assuming the abutment-bearing lever 37 to be locked by the shouldered trip-arm 40, and the wire drawn from the reel and engaged with the coiling blade of the spindle, power is applied to the driving shaft 15. Through the differential-gearing D the spindle and its blade are rapidly rotated, thereby progressively coiling the wire upon the blade and entering it in the internal groove of the head. The wire as rapidly as it is coiled or "spiralized" by the blade is thus advanced rotatively into and along the guide tube 3. During the rotation of the spindle its worm 58 positively rotates the intermeshing worm wheel 56 in the direction indicated by the adjacent arrow in Fig. 2, thereby through the differential gearing F rotating the tappet shaft 49, and at the same time compressing the retracting spring 94. The pawl 59 being in engagement with the ratchet wheel 57 on the differential gear member 55 prevents retrograde movement of the shaft 49. In the rotation of this shaft its tappet arm 52 advances toward the rock-arm 48, and at a predetermined interval of time impinges against the stud or roller 51 on said arm and forcibly depresses the latter. The arm 48 correspondingly depresses the arm 46 and its attached gear rack 43, thereby, through the gear connections, disengaging the shouldered trip-arm 40 from the lever 37 and releasing the abutment from locking engagement with the stud 35 on the disk 34 of the cutter shaft. The cutter shaft is thus free to rotate, and the spindle is temporarily locked through the working load thereon produced by the drag of the wire. The spindle is now quiescent, and the cutter shaft is caused to make one complete rotation. In the initial movement of the cutter shaft the abutment 102 is moved into the path of the stud 101 on the stop disk 100 for the spindle, and is maintained therein until near the completion of the rotation whereupon the abutment is retracted. In such initial movement the pawl and ratchet devices on the shaft 98 below the spindle are actuated by the crank and gear connections from the cutter shaft to effect several slow turns of the spindle and thereby advance the coiled wire with exactitude to the point of severance between the cutters; the stud 101 on the disk 100 thereupon contacting with the abutment 102. During the supplemental rotations of the spindle the tappet shaft, through the worm and differential gearings, is very slightly turned, the tappet arm 52 depressing the arms 48 and 46 to a small extent. In the rotation of the cutter shaft, after the wire has been positioned with respect to the cutters, the cam 130 on said shaft actuates the cutters to effect the severance of the coiled section from the body of the wire. Thereupon, the cam projection 131 escapes the opposing cutter bar and the cutters resume their normal open position. Shortly thereafter the cam 64 on the cutter shaft effects the disengagement of the pawl 59 from the ratchet wheel 57 of the differential gearing F, and the spring 94 resuming its normal open position, effects the retrograde movement of the tappet shaft 49 in a manner to throw its tappet arm 52 upward and backward. The gear rack thus being unrestrained, the trip-arm 40 swings into engagement with the extremity of the abutment-bearing lever 37 and locks it in the path of the stud 35 on the disk 34 of the cutter shaft; thereby upon the engagement of said stud with the abutment stopping the rotation of the cutter shaft.

As hereinbefore described, the wire while being shaped by the coiling blade is rotatively advanced into and supported by the guide tube 3, the lengths or sections during their advancement being interlooped with each other in succession; the interlooped sections are raised intermittently by the take-up, and their endwise movement progressively effected by the co-action of the oppositely-inclined opposing surfaces of contiguous sections; and the stop arms 134 are timely oscillated with respect to the introduction and severance of each coiled section in order to afford determinate intermittent stops for the fabric. Owing to the angularity of their opposing surfaces the sections when intermittently raised are shifted in alternate succession toward and from the fabric, the former being in alinement with the edge of the fabric and the latter projecting therefrom as previously explained. During alternate upward movements of the fabric the tappet fingers 152 in their rotation are caused to impinge against the opposing alternate sections and impart thereto a partial turn in a manner to effect their endwise movement into the fabric and set their angular extremities in proper position with relation to those of the adjacent sections. At the limit of each raise or step of the fabric under construction the cutter-shaft completes its rotation, and the formation of a new section is commenced and continued by the rotation of the coiling spindle. Before the rotative advancement of the wire to the lowermost section within the guide 3, the electric circuit is completed and thus maintained until the new section has been introduced to the fabric, whereupon and before the lifting of the fabric the circuit is broken.

In Figs. 43 to 50 inclusive, I have shown a modification of the devices for positioning the alternate wire sections within the fabric. In this form instead of bodily raising the fabric and then partially turning such sections through the agency of tappet fingers, each alternate section, after its introduction to the fabric, is permitted to drop within limits and make a partial turn during its descent, the opposing angular portions of the adjacent wire sections thus causing the descending section to be shifted endwise into alinement with the edge of the fabric as illustrated. The fabric is then bodily raised to bring the lowermost section into the path of the next succeeding wire section progressing from the coiling and feeding devices. In this modification the guide 3 is divided longitudinally into two parts (x, y) one of which is fixed and the other is hinged thereto along its lower edge, so that the hinged part (y) may be swung downward and upward at predetermined intervals in order respectively to open and close the guide. In the present instance, the hinge rod 168 is affixed to the part y and is provided at one end with a toothed sector 169 which meshes with a gear rack 170 on one end of a slide bar 171 mounted in suitable bearings 172. The opposite end of the bar is provided with a laterally-projecting stud 173 which is held normally in contact with an appropriate cam 174 by means of a suitably-disposed spring 175 encircling the bar. This cam is mounted on a shaft 176 bearing a spur wheel 177 in mesh with a pinion 178 on the cutter shaft 32, whereby in two succeeding rotations of the latter the cam is caused to make a complete rotation. The contour of the cam is such that during about three-quarters of its rotation the position of the rack bar is unaffected, in which period the hinged part of the guide is maintained in closed position, whereupon the stud escaping the abrupt end of the cam, the bar is quickly projected by the spring in a manner to turn the sector and thus open the hinged part of the guide. In the remainder of the rotation, the rack bar is retracted and the hinged part returned to its closed position. When each alternate wire section has been fed into the guide, therein interlooped with the immediately preceding wire section, and finally severed from the body of the wire, the various parts are in the relative positions indicated in Figs. 43, 46 and 49, that is, the guide is closed and the cam is in position to maintain the rack bar at rest. When the cam advances slightly it presents its abrupt portion to the stud of the bar and the latter is thus projected to open the hinged part of the guide. The lowermost wire section thus being laterally unsupported, falls outwardly with and rests upon the hinged part, as indicated in Fig. 47. Thereupon the fabric is bodily raised by the take-up devices and in consequence such section assumes by gravity a vertical position, as indicated in Figs. 45 and 48. The partial turn thus given to the wire section advances it into proper position with respect to the end of the fabric as above indicated. This done, the rack bar is retracted by the cam and the hinged part of the guide is closed; the lowermost wire section within the guide then being in position for the reception of a new wire section from the coiling and feeding devices.

It is to be understood that the mechanism herein set forth to illustrate a form or forms of embodiment of my invention may be modified in various respects without departing from the fair spirit of the invention.

I claim—

1. In a wire netting machine having coiling and cutting mechanisms, the combination with said mechanisms, of a primary driving member, differential gearing between the same and the said mechanisms, and means whereby the said mechanisms are locked and released at predetermined intervals.

2. In a wire netting machine, the combination with a coiling spindle, a cutter shaft, and driving mechanism for said spindle and shaft, of locking and releasing devices for the cutter shaft, and means under the control of the spindle for actuating said devices to release the cutter shaft and effect the stopping of the spindle.

3. In a wire netting machine, the combination with coiling and cutting mechanisms, of a primary driving member, operative connections including differential gearing between the same and said mechanisms, and means whereby said mechanisms are rendered active and idle in alternate succession, said means including an adjustable member whereby the periodicity of the operation of the coiling mechanism can be regulated.

4. In a wire netting machine, the combination with a coiling spindle, and a cutter shaft, of a hollow driving shaft, a central shaft therein, gearing between said central shaft and the cutter shaft, a differential gear whereof one member is connected with the central shaft and the other members with the spindle and driving shaft respectively, and means whereby the spindle and cutter shaft are locked and released at predetermined intervals.

5. In a wire netting machine the combination with a cutter shaft, of a stop device thereon, an abutment movable into and from the path of said device, means for locking the abutment in said path, and means for releasing said abutment at predetermined intervals.

6. In a wire netting machine, the combination with a cutter shaft, of a stop device thereon, an abutment movable into and from the path of said device, a lever carrying said abutment, a trip member for temporarily locking said lever in position with the abutment in the path of the stop device, and means for disengaging the said member from the lever at predetermined intervals.

7. In a wire netting machine, the combination with a shaft, of a stop device connected therewith, a dash-pot including a plunger abutment movable into and from the path of said stop device, means for supporting said abutment, and means for periodically locking it into the path of the stop device.

8. In a wire netting machine, the combination with a coiling spindle, a cutter shaft, and driving mechanism for said spindle and shaft, of locking devices for the spindle under the control of the cutter shaft, and locking devices for the cutter shaft under the control of the spindle.

9. In a wire netting machine, the combination with a coiling spindle, a cutter shaft, and driving mechanism for said spindle and shaft, of locking and releasing devices for the cutter shaft under the control of the spindle, said latter devices including a shaft, gearing between the same and the spindle, and a tappet member on the shaft last-named.

10. In a wire netting machine, the combination with a coiling spindle, a cutter shaft, and driving mechanism for said shaft, of locking and releasing devices for the cutter shaft under the control of the spindle, said latter devices including a shaft, gearing between the same and the spindle, and a tappet member on the shaft last-named, together with means for maintaining said shaft and its tappet member in a normal position.

11. In a wire netting machine, the combination with a coiling spindle, a cutter shaft, and driving mechanism for said spindle and shaft, of locking and releasing devices for the cutter shaft under the control of the spindle, said latter devices including a shaft, gearing between the same and the spindle, a tappet member on the shaft last-named, and means whereby said tappet member is adjustably secured to its shaft.

12. In a wire-netting machine, the combination with a cutter shaft, of a stop device thereon, a dash pot, including a plunger abutment movable into and from the path of said stop device, a movable support for the dash pot, means for temporarily locking said support in position with the abutment in said path, and means for releasing said support at predetermined intervals.

13. In a wire netting machine, the combination with a coiling spindle, a cutter shaft, and driving mechanism for said spindle and shaft, of a stop device connected with the spindle, an abutment movable into and from the path of said device, means for periodically moving said abutment, a stop device connected with the cutter shaft, an abutment movable into and from the path of said latter stop device, and means for periodically locking the latter abutment in said path.

14. In a wire netting machine, the combination with a coiling spindle, a cutter shaft, and driving mechanism for said spindle and shaft, of a stop device connected with the spindle, an abutment movable into and from the path of said device, connections between the cutter shaft and the abutment for periodically moving said abutment, a stop device connected with the cutter shaft, an abutment movable into and from the path of said latter stop device, and means under the control of the coiling spindle for rendering said latter abutment active and inactive at predetermined intervals.

15. In a wire netting machine, the combination with a coiling spindle, a cutter shaft, and driving mechanism for said spindle and shaft, of a locking device for the cutter shaft, a tappet shaft, a tappet member thereon, a differential gear on the tappet shaft, a stop device for one member of said gear, connections between another member thereof and the coiling spindle, devices in the path of the tappet member for releasing the locking device for the cutter shaft, means for maintaining the tappet shaft normally in position with the tappet arm disengaged from the said lock-releasing devices, and means under the influence of the cutter shaft for controlling the stop device for the differential gear.

16. In a wire netting machine, the combination with a coiling spindle, a cutter shaft, and driving mechanism for said spindle and shaft, of a locking device for the cutter shaft, a tappet shaft, a tappet member thereon, a differential gear on the tappet shaft, a ratchet wheel on one member of said gear, connections between another member thereof and the coiling spindle, a pawl for engaging the ratchet member, means for maintaining the tappet shaft normally in position with the tappet arm disengaged from the lock releasing devices, and means under the influence of the cutter shaft for rendering the pawl active and inactive at predetermined intervals.

17. In a wire netting machine, the combination with a coiling spindle, a cutter shaft, and driving mechanism therefor including a differential gear, of a locking device for the cutter shaft, a tappet shaft, a tappet member thereon, a differential gear on the tappet shaft, a stop device for one member of the latter gear, connections between another member thereof and the coiling spindle, devices in the path of the tappet member for releasing the locking member for the cutter shaft, means for maintaining the tappet arm normally in position with the tappet arm disengaged from the said lock-releasing devices, and means under the influence of the cutter shaft for controlling the stop device for the differential gear.

18. In a wire netting machine, the combination with a coiling spindle, a cutter shaft, and driving mechanism therefor, including a differential gear, of a locking device for the cutter shaft, a tappet shaft, a tappet member thereon, a differential gear on the tappet shaft, a ratchet wheel on one member of said latter gear, worm gearing between the other member thereof and the coiling spindle, a pawl for engaging the ratchet wheel, lock-releasing devices in the path of the tappet, means for maintaining the tappet shaft normally in position with the tappet arm disengaged from the lock-releasing devices, and means under the control of the cutter shaft for rendering the pawl active and inactive at predetermined intervals.

19. In a wire netting machine, the combination with the coiling spindle and cutting mechanism, of means for rapidly rotating said spindle, means for temporarily stopping the same, and means for imparting a slower supplemental movement to the spindle.

20. In a wire netting machine, the combination with a coiling spindle, a cutter shaft, and driving mechanism for said spindle and shaft, of locking and releasing devices for the cutter shaft, means under the control of the spindle for actuating said devices to release the cutter shaft and effect the stopping of the spindle, and means for thereafter imparting a supplemental rotary movement to the spindle.

21. In a wire netting machine, the combination with a coiling spindle, a cutter shaft, and driving mechanism, including a differential gear, for said spindle and shaft, of locking and releasing devices for the cutter shaft, means including a differential gear under the control of the spindle for actuating said devices to release the cutter shaft and effect the stopping of the spindle, and means for thereafter imparting a supplemental rotary movement to the spindle.

22. In a wire netting machine the combination with a coiling spindle, a cutter shaft, and driving mechanism for said spindle and shaft, of locking and releasing devices for the cutter shaft, means under the control of the spindle for actuating said devices to release the cutter shaft and effect the stopping of the spindle, means for thereafter imparting a supplemental rotary movement to the spindle, locking devices for the spindle, and means under the control of the cutter shaft for operating said latter devices.

23. In a wire netting machine, the combination with the coiling spindle and the cutter shaft, of supplemental spindle-actuating mechanism comprising a shaft, pawl and ratchet devices thereon, gearing between the ratchet and the spindle, and operative connections between the pawl and the cutter shaft.

24. In a wire netting machine having coiling and cutting mechanisms, the combination with said mechanisms, of means for partially turning each alternate section after its severance from the body of the wire.

25. In a wire netting machine having coiling and cutting mechanisms, the combination with said mechanisms, of means for supporting each succeeding section of wire during its formation and interloopment with the immediately preceding section, and means for partially turning each alternate section after its severance from the body of the wire.

26. In a wire netting machine having coiling and cutting mechanisms, the combination with said mechanisms, of means for supporting each succeeding section of wire during its formation and interloopment with the immediately preceding section, means for permitting relative transverse movement of said sections, and means for partially turning each alternate section after its severance from the body of the wire.

27. In a wire netting machine having coiling and cutting mechanisms, the combination with said mechanisms, of means for supporting each succeeding section of wire during its formation and interloopment with the immediately preceding section, means for intermittently raising the series of interlooped wires, and means for partially turning each alternate section after its severance from the body of the wire.

28. In a wire netting machine having coiling and cutting mechanisms, the combination with said mechanisms, of means for supporting each succeeding section of wire during its formation and interloopment with the immediately preceding section, means for permitting relative transverse movement of said sections, tappet devices for engaging and partially turning the alternate sections, and means for actuating said tappet devices at predetermined intervals.

29. In a wire netting machine having wire coiling and wire cutting mechanisms, the combination with said mechanisms, of means for supporting each succeeding section of wire during its formation and interloopment with the immediately preceding section, means for permitting relative transverse movement of said sections, tappet fingers movable diagonally toward the alternate sections to engage and partially turn the same, and means for actuating said fingers at predetermined intervals.

30. In a wire netting machine having wire coiling and wire cutting mechanisms, the combination with said mechanisms, of means for supporting each succeeding section of wire during its formation and interloopment with the immediately preceding section, means for permitting relative transverse movement of said sections, tappet fingers movable diagonally toward the alternate sections to engage and partially turn the same, rotary gearing carrying said fingers, and means for actuating said gearing at predetermined intervals.

31. In a wire netting machine having coiling and cutting mechanisms, the combination with said mechanisms, of means for intermittently taking up the fabric section by section, a rock shaft, arms thereon embracing the plane of the fabric, oppositely projecting pins on the said arms, and means for periodically oscillating the shaft to move the pins in alternate succession into and from the loops of succeeding rows of meshes in the fabric.

32. In a wire netting machine having coiling and cutting mechanisms, the combination with said mechanisms, of means for intermittently taking up the fabric section by section, a rock shaft, arms thereon embracing the plane of the fabric, oppositely projecting pins on the said arms, means for periodically oscillating the shaft to move the pins in alternate succession into and from the loops of succeeding rows of meshes in the fabric, and means for effecting vertical adjustment of said shaft and its appurtenances.

33. In a wire netting machine, the combination with a guide in which the successive wire sections are supported and interlooped, of electro-magnetic devices adjacent said guide for attracting and supporting the said sections.

34. In a wire netting machine having coiling and cutting mechanisms, the combination with a guide in which the successive wire sections are supported and interlooped during their formation, of a series of electro-magnets adjacent said guide, and means for periodically completing and breaking the electric circuit in which said magnets are included.

Signed at New York, in the county of New York and State of New York this eighth day of July 1909.

FRANK N. ROEHRICH.

Witnesses:
JAMES LORD,
JOHN R. NOLAN.

---

Copies of this patent may be obtained for five cents each, by addressing the "Commissioner of Patents, Washington, D. C."